US011342952B2

(12) United States Patent
Galeev et al.

(10) Patent No.: US 11,342,952 B2
(45) Date of Patent: May 24, 2022

(54) MILLIMETER WAVE (MMWAVE) SYSTEM AND METHODS

(71) Applicant: Apple Inc., Cupertino, CA (US)

(72) Inventors: Mikhail T. Galeev, Portland, OR (US); Oner Orhan, San Jose, CA (US); Arnaud Lucres Amadjikpe, Beaverton, OR (US); Benjamin Grewell, Portland, OR (US); Navid Naderializadeh, Santa Clara, CA (US); Hosein Nikopour, San Jose, CA (US); Susruth Sudhakaran, Beaverton, OR (US); Shilpa Talwar, Cupertino, CA (US); Liang Xian, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/052,113

(22) PCT Filed: Jun. 22, 2018

(86) PCT No.: PCT/US2018/038906
§ 371 (c)(1),
(2) Date: Oct. 30, 2020

(87) PCT Pub. No.: WO2019/245572
PCT Pub. Date: Dec. 26, 2019

(65) Prior Publication Data
US 2021/0126661 A1    Apr. 29, 2021

(51) Int. Cl.
*H04B 1/10*    (2006.01)
*H04B 1/12*    (2006.01)
*H04B 1/525*   (2015.01)

(52) U.S. Cl.
CPC ........... *H04B 1/1027* (2013.01); *H04B 1/123* (2013.01); *H04B 1/525* (2013.01)

(58) Field of Classification Search
CPC .................................................. H04B 1/1027
(Continued)

(56) References Cited

U.S. PATENT DOCUMENTS

2003/0181180 A1   9/2003   Darabi et al.
2005/0147192 A1   7/2005   Yamamoto et al.
(Continued)

FOREIGN PATENT DOCUMENTS

CN      104052700 A    9/2014
CN      105898855 A    8/2016
(Continued)

OTHER PUBLICATIONS

International Search Report and Written Opinion for International Application No. PCT/US2018/038906, dated Feb. 15, 2019, 14 pgs.
(Continued)

*Primary Examiner* — Joseph Chang
(74) *Attorney, Agent, or Firm* — Kowert, Hood, Munyon, Rankin & Goetzel, P.C.

(57) ABSTRACT

A mobile communication device that is configured to cancel interference within received millimeter wave band signals. The device includes a receiver circuit that is configured to receive a millimeter wave band signal, adjust gain provided to the millimeter wave band signal at a first amplifier, cancel interference in millimeter wave band signal after gain is adjusted by the first amplifier, and adjust gain provided to the millimeter wave band signal at a second amplifier after interference is cancelled.

20 Claims, 20 Drawing Sheets

(58) Field of Classification Search
USPC .......................................................... 375/346
See application file for complete search history.

(56) References Cited

U.S. PATENT DOCUMENTS

| | | | |
|---|---|---|---|
| 2007/0291880 A1* | 12/2007 | Ashkenazi | ........... H03G 3/3068 |
| | | | 375/345 |
| 2009/0215420 A1 | 8/2009 | Mendoza et al. | |
| 2011/0007780 A1 | 1/2011 | Shimoni | |
| 2012/0119953 A1 | 5/2012 | Hosoya et al. | |
| 2013/0308717 A1 | 11/2013 | Maltsev et al. | |
| 2015/0280734 A1 | 10/2015 | Si | |

FOREIGN PATENT DOCUMENTS

| | | | |
|---|---|---|---|
| CN | 107276621 A | 10/2017 | |
| EP | 2731265 A1 | 5/2014 | |
| JP | H03160822 A | 7/1991 | |
| WO | 2006130272 A2 | 12/2006 | |

OTHER PUBLICATIONS

International Preliminary Report on Patentability for International Application No. PCT/US2018/038906, dated Aug. 9, 2021, 7 pgs.
Extended European Search Report for European Patent Application No. EP18923182; dated Mar. 1, 2021; 9 Pages.
Chinese Office Action; Chinese Application No. 201880092719.9, dated Aug. 23, 2021, 16 pgs.

\* cited by examiner

MILLIMETER WAVE (MMWAVE) SYSTEM AND METHODS

This application is a U.S. National Stage filing of International Application No. PCT/US2018/038906, filed Jun. 22, 2018, titled "Millimeter Wave (MMWAVE) System and Methods", which is incorporated herein by reference in its entirety.

TECHNICAL FIELD

This document pertains generally, but not by way of limitation, to millimeter wave (mmWave) systems and methods. More specifically, this document pertains to mmWave receivers and methods to prevent signal interference within mmWave systems.

BACKGROUND

Communication devices may exchange various signals with other devices, such as data signals, control signals, or other signals. Typically, a radio frequency front end (RFFE) receives these signals for processing. As more and more communication devices are put into use, data traffic continues to increase, creating numerous undesired signals that can provide interference or noise for any given signal intended for a particular communication device. Directional interference, along with line-of-sight obstacles also continue to provide challenges for providing clear signal paths and undesired signal blockages or loss.

As technologies such as autonomous vehicles and drones advance, to avoid undesired collisions, promote more efficient traffic efficiency, and the like, raw data exchange from cameras, sensors, radars, lidars, and the like continue to increase. This only underscores the need for communication devices with higher data rates, better reliability, and low latency.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document.

DETAILED DESCRIPTION

A large spectrum of mmWave bands can be utilized for high data rate communication for communication devices. Such systems provide increased location accuracy, inherent physical layer security, and extended coverage. The mitigation of interference and blockages enhances these communication devices to provide enhanced reliability.

Figure 1:
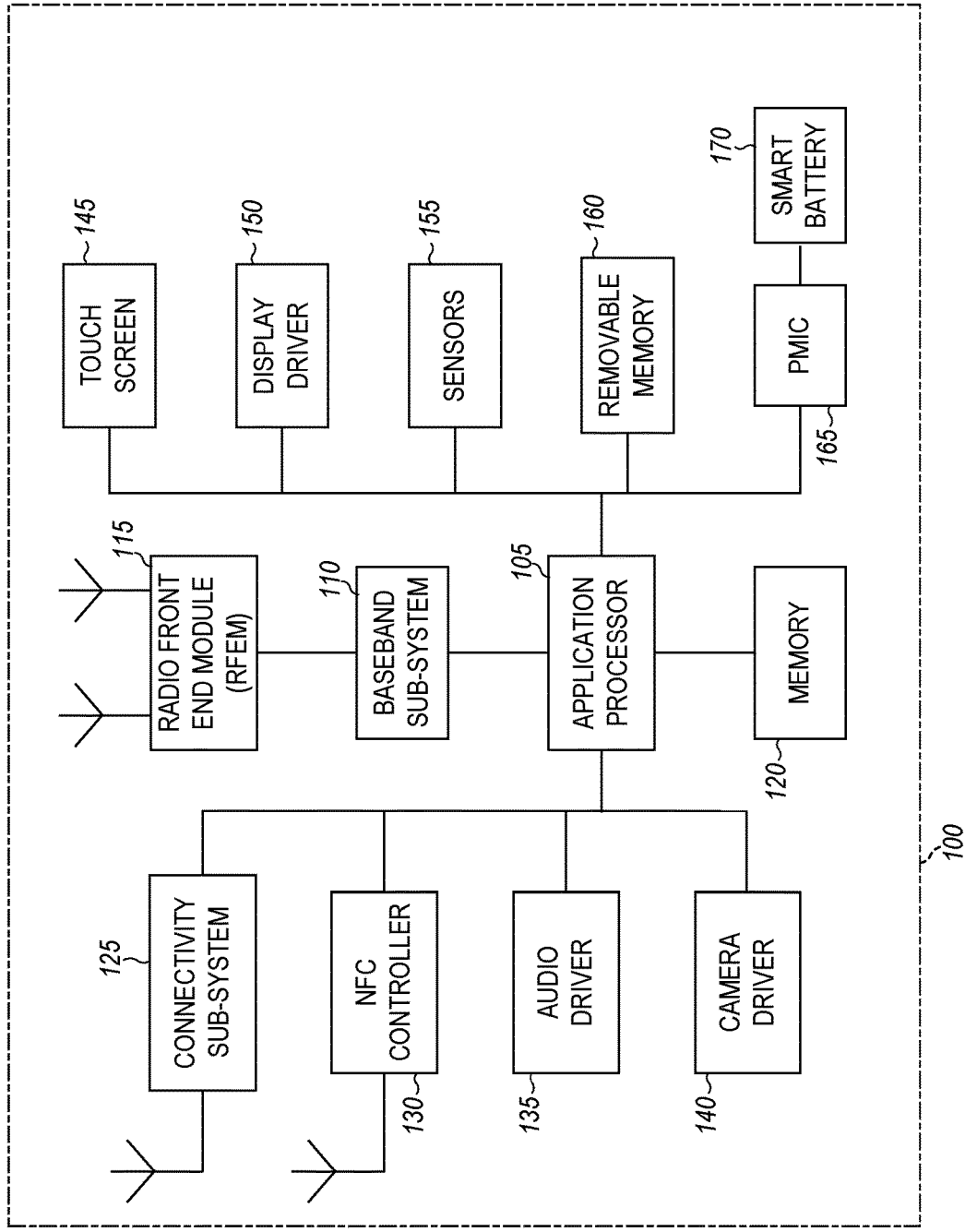
FIG. 1 illustrates an exemplary user device according to some aspects.

FIG. 1 illustrates an exemplary user device according to some aspects that may utilize the disclosed mmWave systems and receivers in some aspects. The user device 100 may be a mobile device in some aspects and includes an application processor 105, baseband processor 110 (also referred to as a baseband sub-system), radio front end module (RFEM) 115, memory 120, connectivity sub-system 125, near field communication (NFC) controller 130, audio driver 135, camera driver 140, touch screen 145, display driver 150, sensors 155, removable memory 160, power management integrated circuit (PMIC) 165, and smart battery 170.

In some aspects, application processor 105 may include, for example, one or more central processing unit (CPU) cores and one or more of cache memory, low drop-out voltage regulators (LDOs), interrupt controllers, serial interfaces such as SPI, I2C or universal programmable serial interface sub-system, real time clock (RTC), timer-counters including interval and watchdog timers, general purpose IO, memory card controllers such as SD/MMC or similar, USB interfaces, MIPI interfaces, and/or Joint Test Access Group (JTAG) test access ports.

In some aspects, baseband processor 110 may be implemented, for example, as a solder-down substrate including one or more integrated circuits, a single packaged integrated circuit soldered to a main circuit board, and/or a multi-chip module including two or more integrated circuits.

Applications of mmWave technology can include, for example, WiGig and future 5G, but the mmWave technology can be applicable to a variety of telecommunications systems. The mmWave technology can be especially attractive for short-range telecommunications systems. WiGig devices operate in the unlicensed 60 GHz band, whereas 5G mmWave is expected to operate initially in the licensed 28

GHz and 39 GHz bands. A block diagram of an example baseband sub-system 110 and RFEM 115 in a mmWave system is shown in FIG. 1A.

Figure 1A:
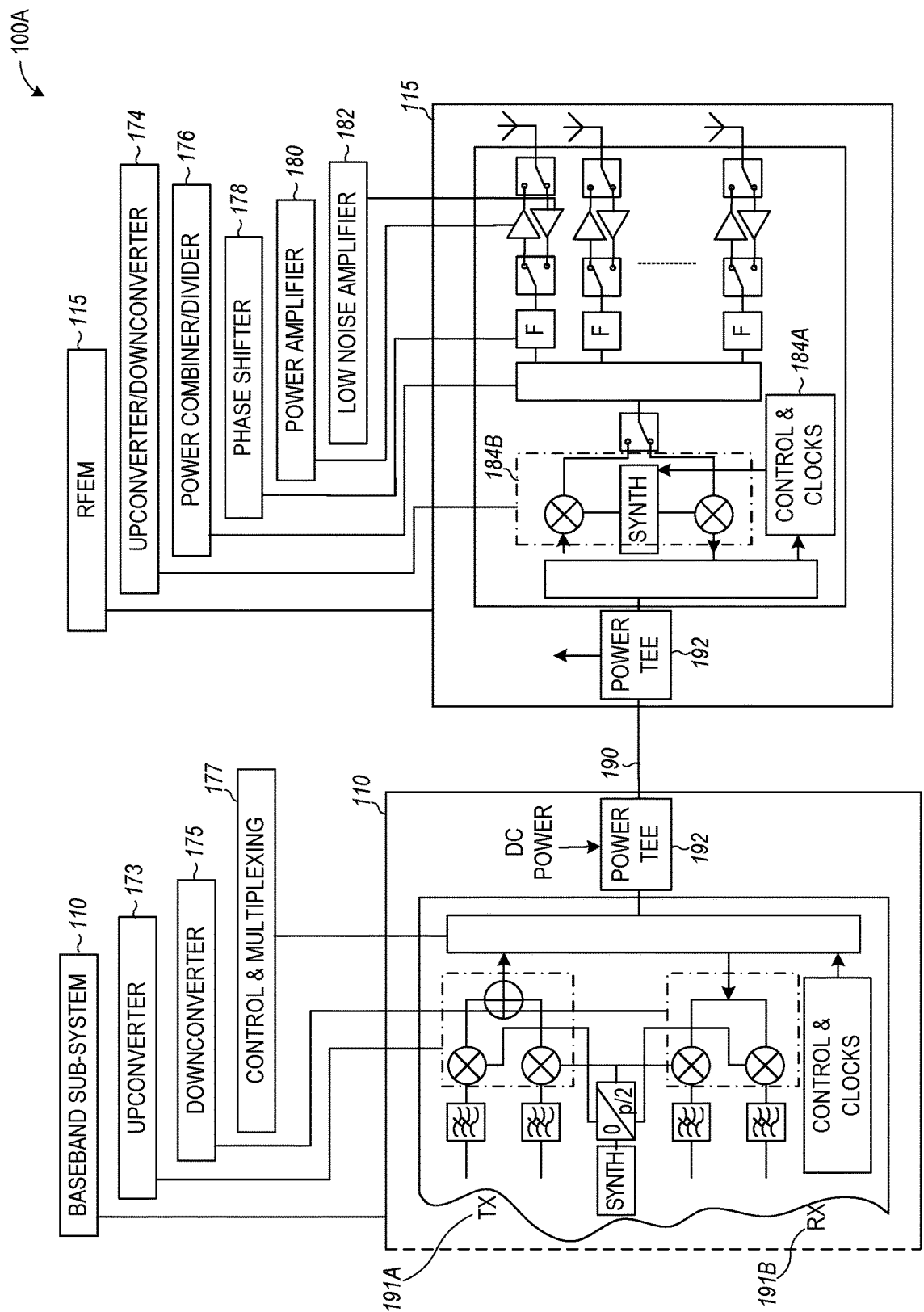
FIG. 1A illustrates a mmWave system, which can be used in connection with the device of FIG. 1 according to some aspects.

FIG. 1A illustrates a mmWave system 100A, which can be used in connection with the device 100 of FIG. 1 according to some aspects of the present disclosure. The system 100A includes two components: a baseband sub-system 110 and one or more radio front end modules (RFEMs) 115. The RFEM 115 can be connected to the baseband sub-system 110 by a single coaxial cable 190, which supplies a modulated intermediate frequency (IF) signal, DC power, clocking signals and control signals.

The baseband sub-system 110 is not shown in its entirety, but FIG. 1A rather shows an implementation of analog front end. This includes a transmitter (TX) section 191A with an upconverter 173 to upconvert the baseband signal frequency to an intermediate frequency (IF) (around 10 GHz in current implementations), a receiver (RX) section 191B with downconversion 175 to down convert from IF to baseband, control and multiplexing circuitry 177 including a combiner to multiplex/demultiplex transmit and receive signals onto a single cable 190. In addition, power tee circuitry 192 (which includes discrete components) is included on the baseband circuit board to provide DC power for the RFEM 115. In some aspects, the combination of the TX section and RX section may be referred to as a transceiver, to which may be coupled one or more antennas or antenna arrays of the types described herein.

The RFEM 115 can be a small circuit board including a number of printed antennas and one or more RF devices containing multiple radio chains, including upconversion/downconversion 174 to millimeter wave frequencies, power combiner/divider 176, programmable phase shifting 178 and power amplifiers (PA) 180, low noise amplifiers (LNA) 182, as well as control and clocks circuitry 184A and power management circuitry 184B. This arrangement can be different from Wi-Fi or cellular implementations, which generally have all RF and baseband functionality integrated into a single unit and only antennas may be connected remotely to the integrated RF and baseband unit via coaxial cables.

This architectural difference can be driven by the very large power losses in coaxial cables at millimeter wave frequencies. These power losses can reduce the transmit power at the antenna and reduce receive sensitivity. In order to avoid this issue, in some aspects, PAs 180 and LNAs 182 may be moved to the RFEM 115 with integrated antennas. In addition, the RFEM 115 may include upconversion/downconversion 174 so that the IF signals over the coaxial cable 190 can be at a lower frequency. Additional system context for mmWave 5G apparatuses, techniques and features is discussed herein below.

Figure 2A:
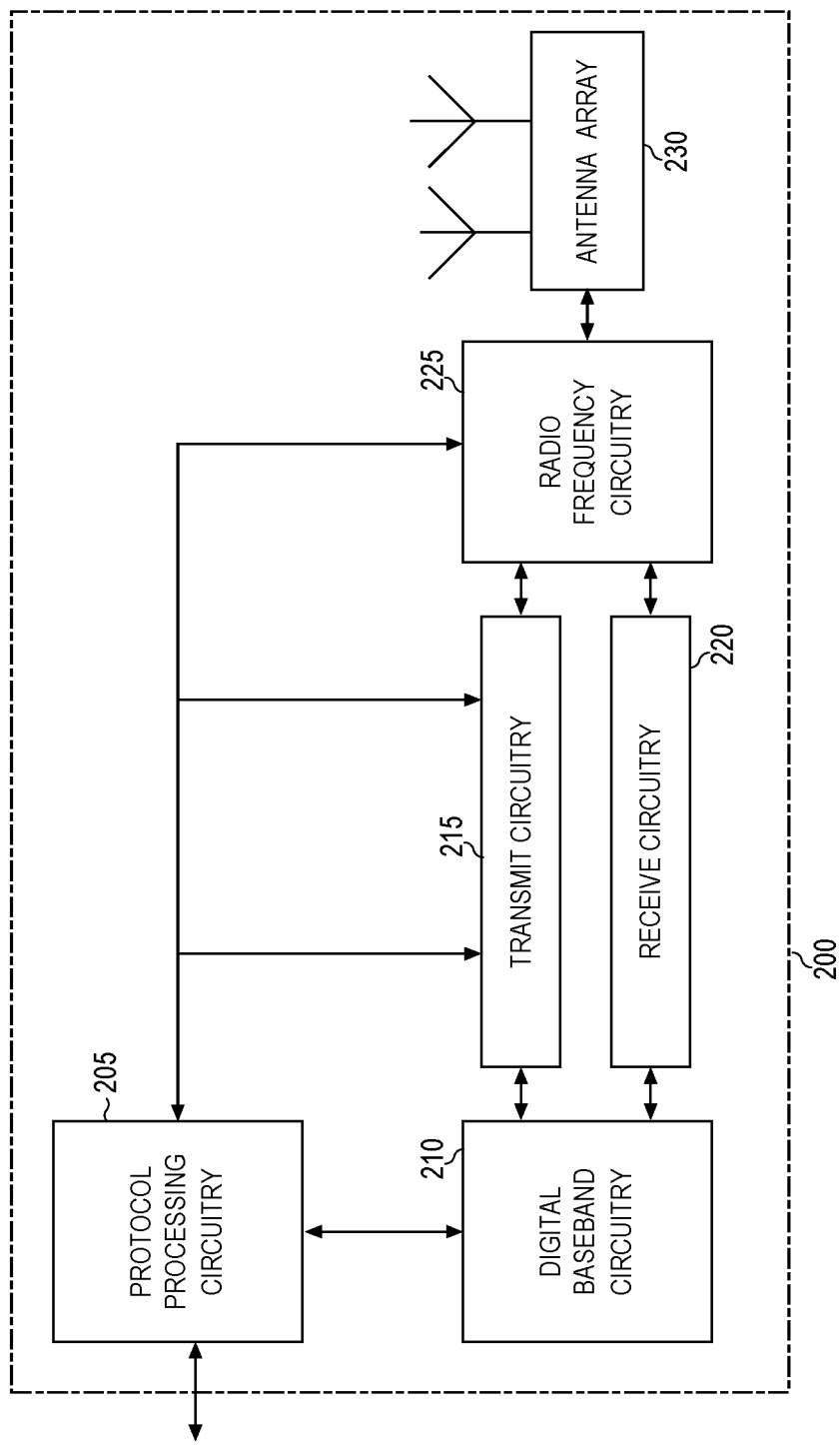
FIG. 2A illustrates exemplary millimeter wave communication circuitry according to some aspects.
Figure 2B:
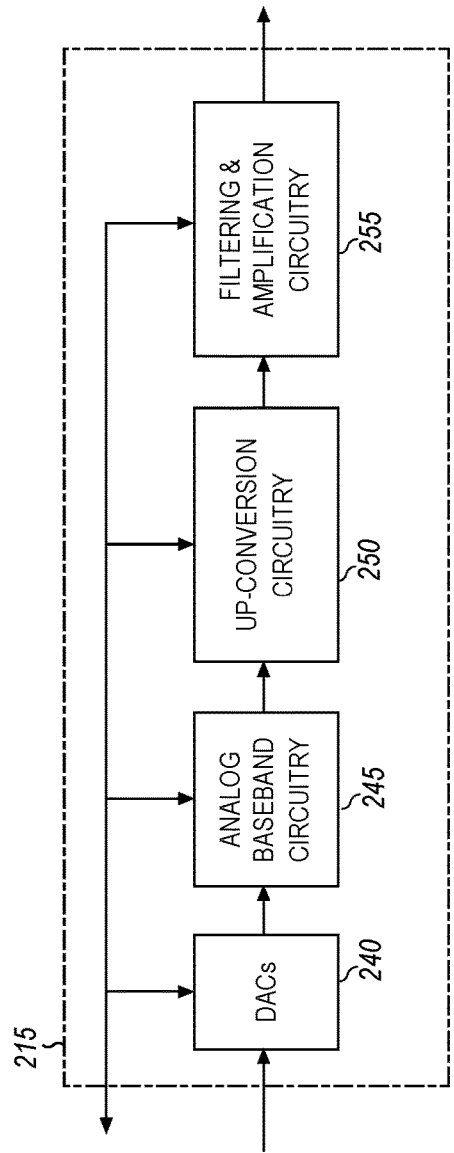
FIG. 2B illustrates aspects of exemplary transmit circuitry illustrated in FIG. 2A according to some aspects.
Figure 2C:
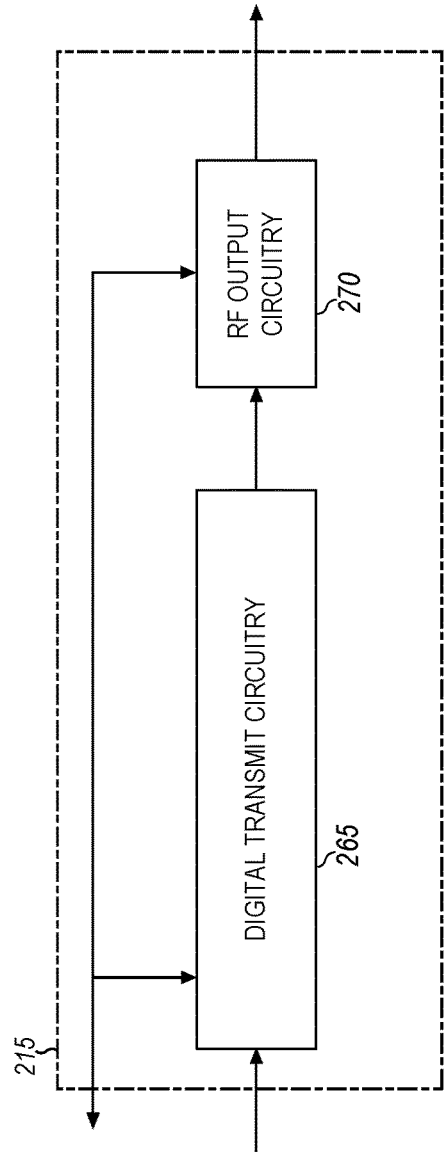
FIG. 2C illustrates aspects of exemplary transmit circuitry illustrated in FIG. 2A according to some aspects.
Figure 2D:
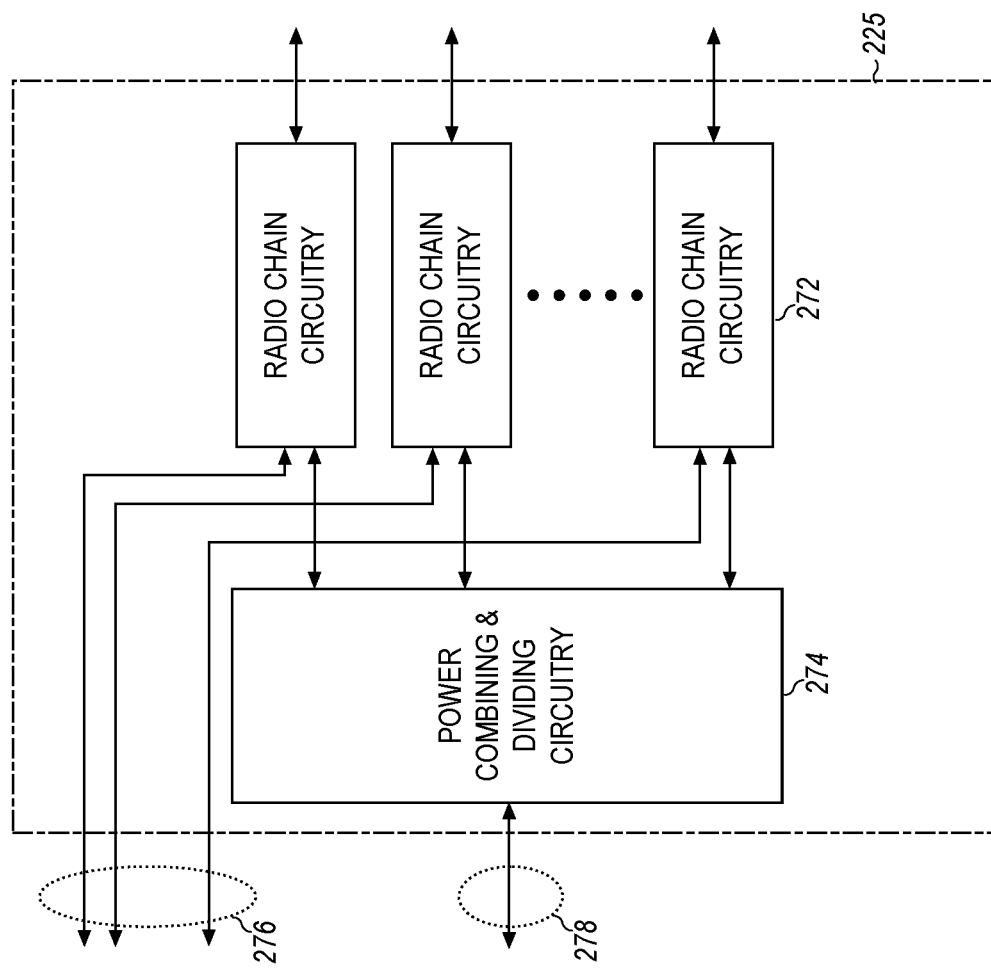
FIG. 2D illustrates aspects of exemplary radio frequency circuitry illustrated in FIG. 2A according to some aspects.
Figure 2E:
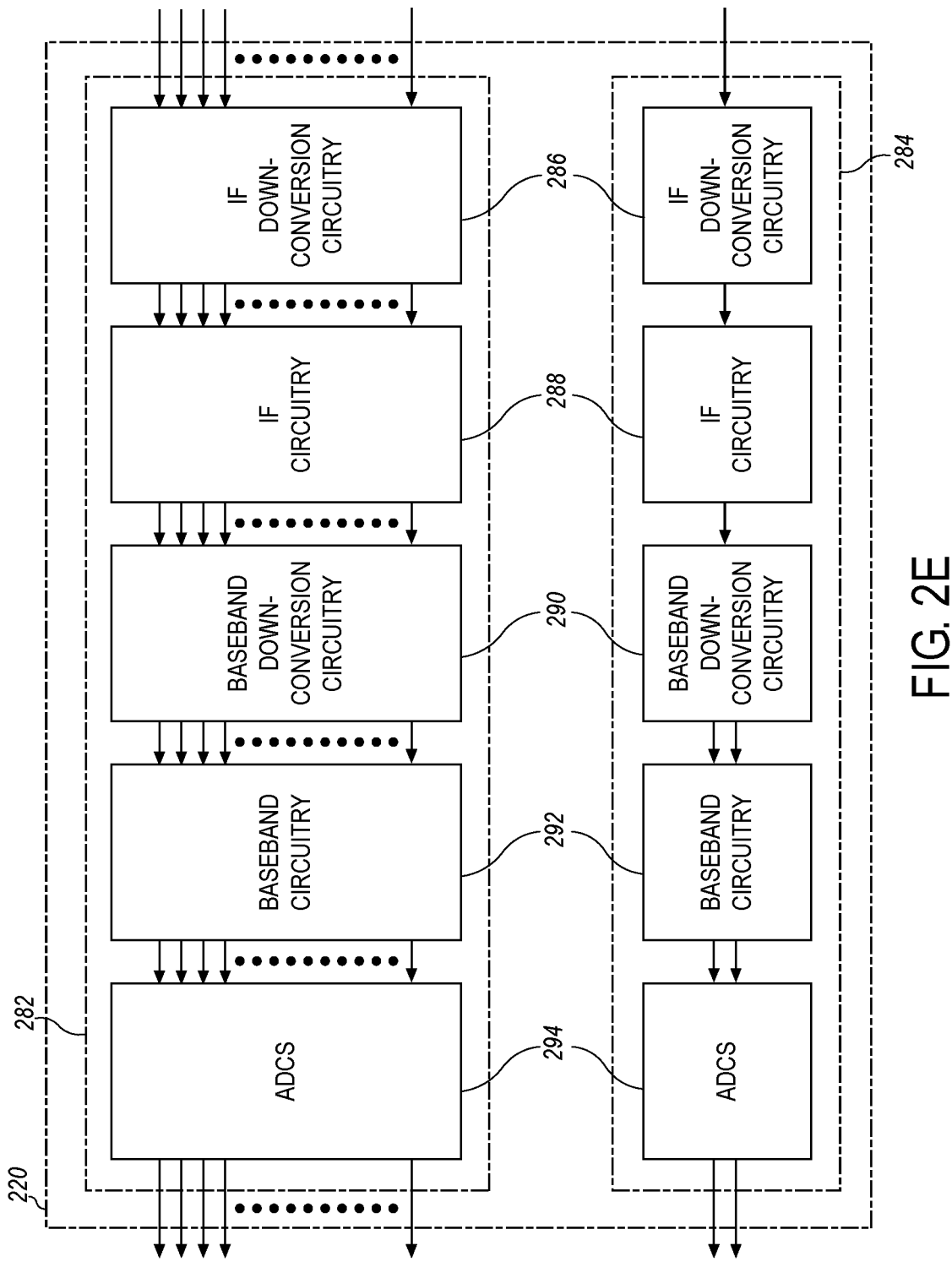
FIG. 2E illustrates aspects of exemplary receive circuitry in FIG. 2A according to some aspects.

FIG. 2A illustrates exemplary mmWave communication circuitry according to some aspects that may utilize the disclosed receiver circuitry, according to some aspects; FIGS. 2B and 2C illustrate aspects of transmit circuitry shown in FIG. 2A according to some aspects; FIG. 2D illustrates aspects of radio frequency circuitry shown in FIG. 2A according to some aspects; FIG. 2E illustrates aspects of receive circuitry in FIG. 2A according to some aspects that may utilize the disclosed receiver circuitry. Millimeter wave communication circuitry 200 shown in FIG. 2A may be alternatively grouped according to functions. Components illustrated in FIG. 2A are provided here for illustrative purposes and may include other components not shown in FIG. 2A.

Millimeter wave communication circuitry 200 may include protocol processing circuitry 205 (or processor) or other means for processing. Protocol processing circuitry 205 may implement one or more of medium access control (MAC), radio link control (RLC), packet data convergence protocol (PDCP), radio resource control (RRC) and non-access stratum (NAS) functions, among others. Protocol processing circuitry 205 may include one or more processing cores to execute instructions and one or more memory structures to store program and data information.

Millimeter wave communication circuitry 200 may further include digital baseband circuitry 210. Digital baseband circuitry 210 may implement physical layer (PHY) functions including one or more of hybrid automatic repeat request (HARD) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

Millimeter wave communication circuitry 200 may further include transmit circuitry 215, receive circuitry 220 and/or antenna array circuitry 230. Millimeter wave communication circuitry 200 may further include RF circuitry 225. In some aspects, RF circuitry 225 may include one or multiple parallel RF chains for transmission and/or reception. Each of the RF chains may be connected to one or more antennas of antenna array circuitry 230.

In some aspects, protocol processing circuitry 205 may include one or more instances of control circuitry. The control circuitry may provide control functions for one or more of digital baseband circuitry 210, transmit circuitry 215, receive circuitry 220, and/or RF circuitry 225.

FIGS. 2B and 2C illustrate aspects of transmit circuitry shown in FIG. 2A according to some aspects. Transmit circuitry 215 shown in FIG. 2B may include one or more of digital to analog converters (DACs) 240, analog baseband circuitry 245, up-conversion circuitry 250 and/or filtering and amplification circuitry 255. DACs 240 may convert digital signals into analog signals. Analog baseband circuitry 245 may perform multiple functions as indicated below. Up-conversion circuitry 250 may up-convert baseband signals from analog baseband circuitry 245 to RF frequencies (e.g., mmWave frequencies). Filtering and amplification circuitry 255 may filter and amplify analog signals. Control signals may be supplied between protocol processing circuitry 205 and one or more of DACs 240, analog baseband circuitry 245, up-conversion circuitry 250 and/or filtering and amplification circuitry 255.

Transmit circuitry 215 shown in FIG. 2C may include digital transmit circuitry 265 and RF circuitry 270. In some aspects, signals from filtering and amplification circuitry 255 may be provided to digital transmit circuitry 265. As above, control signals may be supplied between protocol processing circuitry 205 and one or more of digital transmit circuitry 265 and RF circuitry 270.

FIG. 2D illustrates aspects of radio frequency circuitry shown in FIG. 2A according to some aspects. Radio frequency circuitry 225 may include one or more instances of radio chain circuitry 272, which in some aspects may include one or more filters, power amplifiers, low noise amplifiers, programmable phase shifters and power supplies.

Radio frequency circuitry 225 may also in some aspects include power combining and dividing circuitry 274. In some aspects, power combining and dividing circuitry 274 may operate bidirectionally, such that the same physical circuitry may be configured to operate as a power divider when the device is transmitting, and as a power combiner when the device is receiving. In some aspects, power combining and dividing circuitry 274 may include one or more wholly or partially separate circuitries to perform power dividing when the device is transmitting and power combining when the device is receiving. In some aspects, power combining and dividing circuitry 274 may include passive circuitry including one or more two-way power divider/combiners arranged in a tree. In some aspects, power combining and dividing circuitry 274 may include active circuitry including amplifier circuits.

In some aspects, radio frequency circuitry 225 may connect to transmit circuitry 215 and receive circuitry 220 in FIG. 2A. Radio frequency circuitry 225 may connect to transmit circuitry 215 and receive circuitry 220 via one or more radio chain interfaces 276 and/or a combined radio chain interface 278. In some aspects, one or more radio chain interfaces 276 may provide one or more interfaces to one or more receive or transmit signals, each associated with a single antenna structure. In some aspects, the combined radio chain interface 278 may provide a single interface to one or more receive or transmit signals, each associated with a group of antenna structures.

FIG. 2E illustrates aspects of receive circuitry in FIG. 2A according to some aspects. Receive circuitry 220 may include one or more of parallel receive circuitry 282 and/or one or more of combined receive circuitry 284. In some aspects, the one or more parallel receive circuitry 282 and one or more combined receive circuitry 284 may include one or more Intermediate Frequency (IF) down-conversion circuitry 286, IF processing circuitry 288, baseband down-conversion circuitry 290, baseband processing circuitry 292 and analog-to-digital converter (ADC) circuitry 294. As used herein, the term "intermediate frequency" refers to a frequency to which a carrier frequency (or a frequency signal) is shifted as in intermediate step in transmission, reception, and/or signal processing. IF down-conversion circuitry 286 may convert received RF signals to IF. IF processing circuitry 288 may process the IF signals, e.g., via filtering and amplification. Baseband down-conversion circuitry 290 may convert the signals from IF processing circuitry 288 to baseband. Baseband processing circuitry 292 may process the baseband signals, e.g., via filtering and amplification. ADC circuitry 294 may convert the processed analog baseband signals to digital signals.

Figure 3:
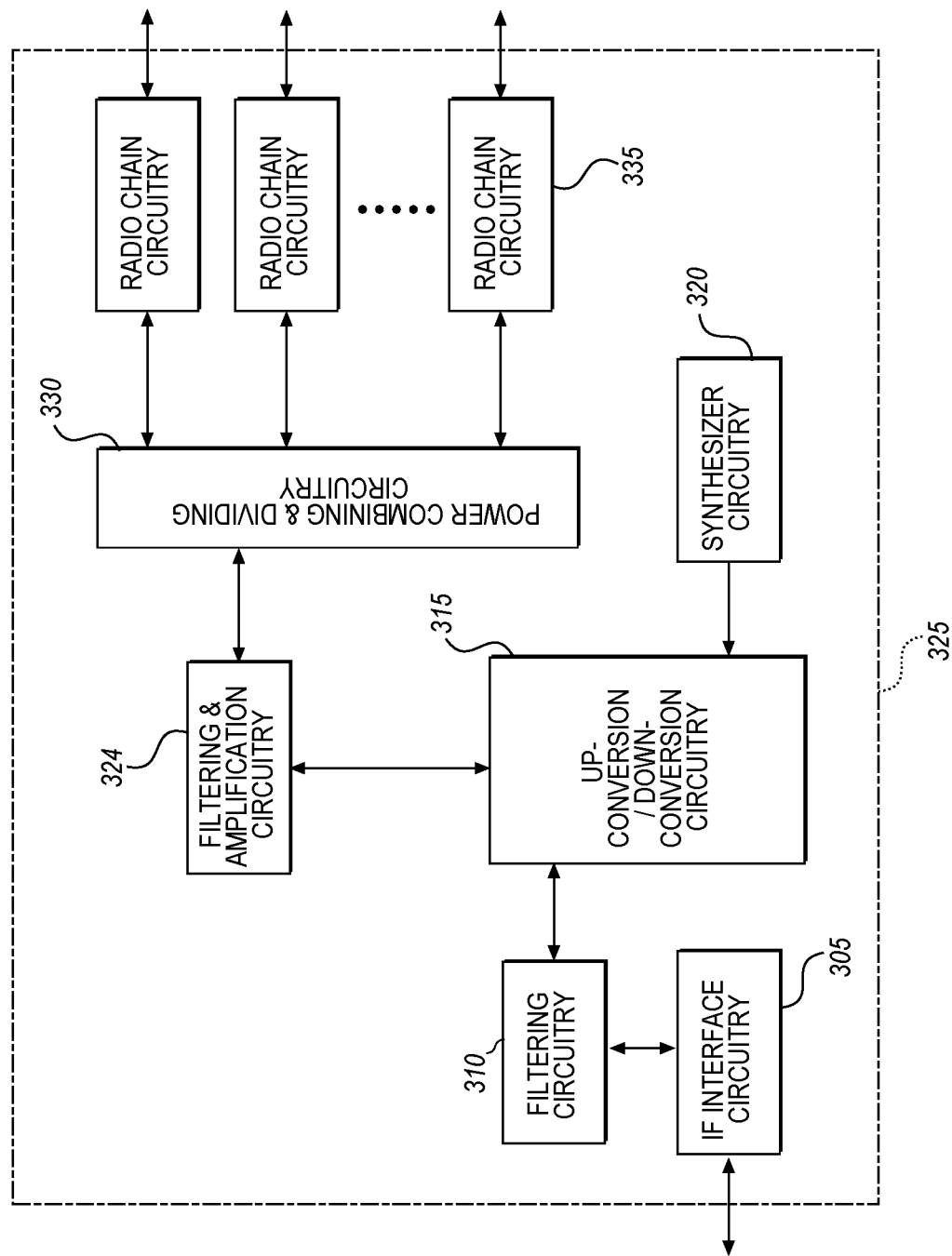
FIG. 3 illustrates exemplary useable radio frequency (RF) circuitry in FIG. 2A according to some aspects.

FIG. 3 illustrates exemplary RF circuitry of FIG. 2A according to some aspects. In an aspect, RF circuitry 225 in FIG. 2A (depicted in FIG. 3 using reference number 325) may include one or more of the IF interface circuitry 305, filtering circuitry 310, up-conversion and down-conversion circuitry 315, synthesizer circuitry 320, filtering and amplification circuitry 324, power combining and dividing circuitry 330, and radio chain circuitry 335.

Figure 4:
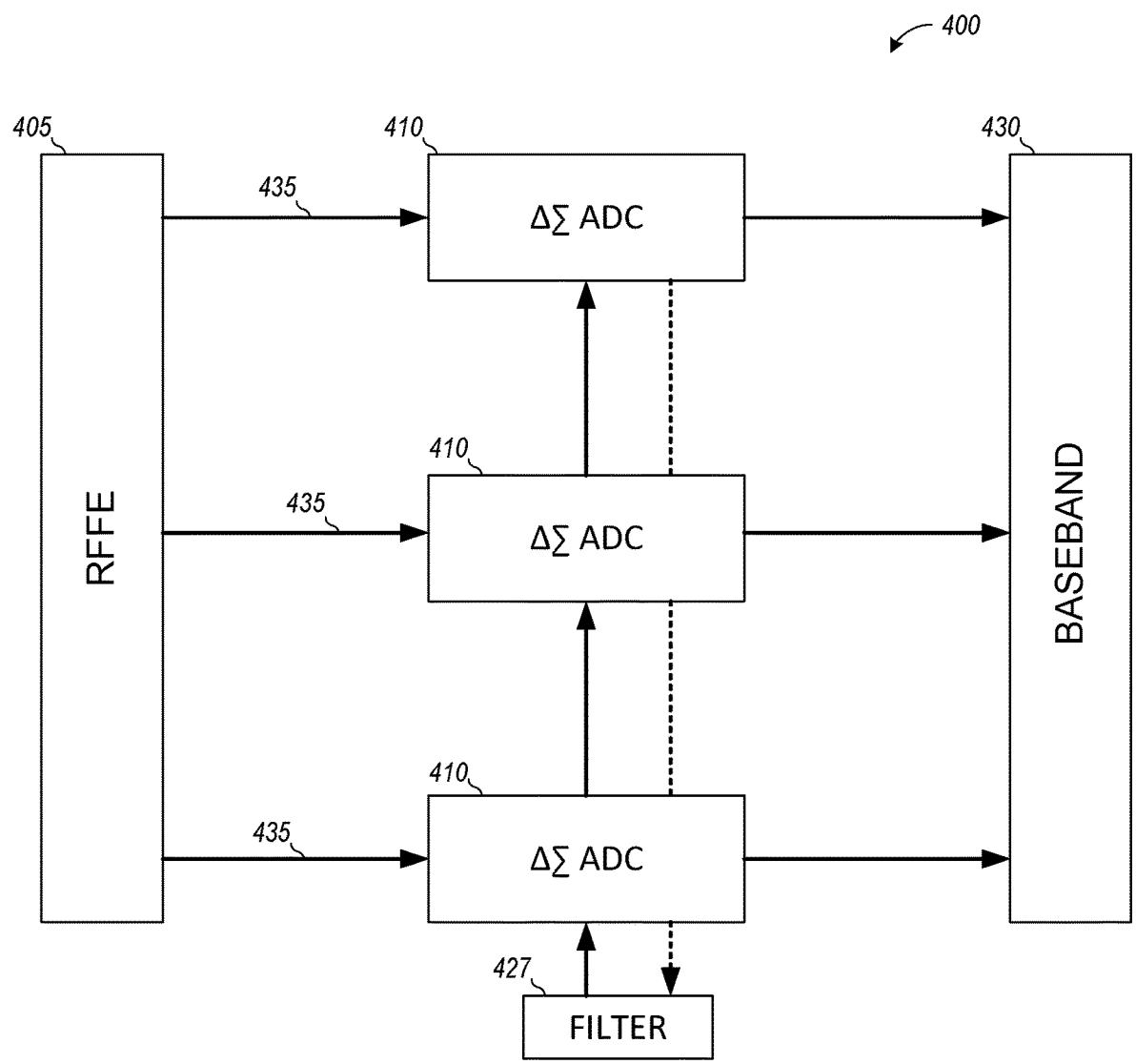
FIG. 4 illustrates exemplary receiver circuitry according to some aspects.
Figure 5:
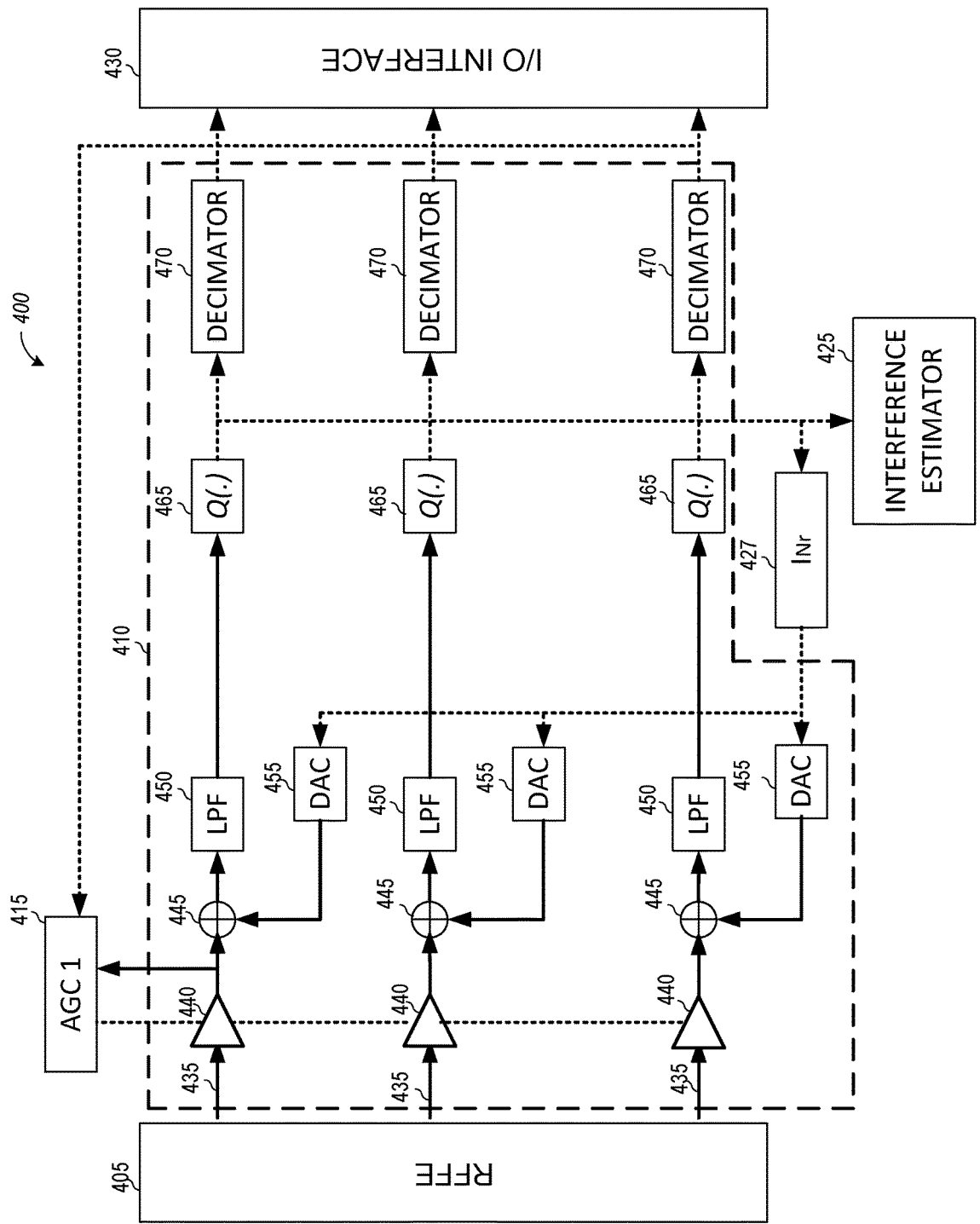
FIG. 5 illustrates exemplary receiver circuitry according to some aspects.
Figure 6:
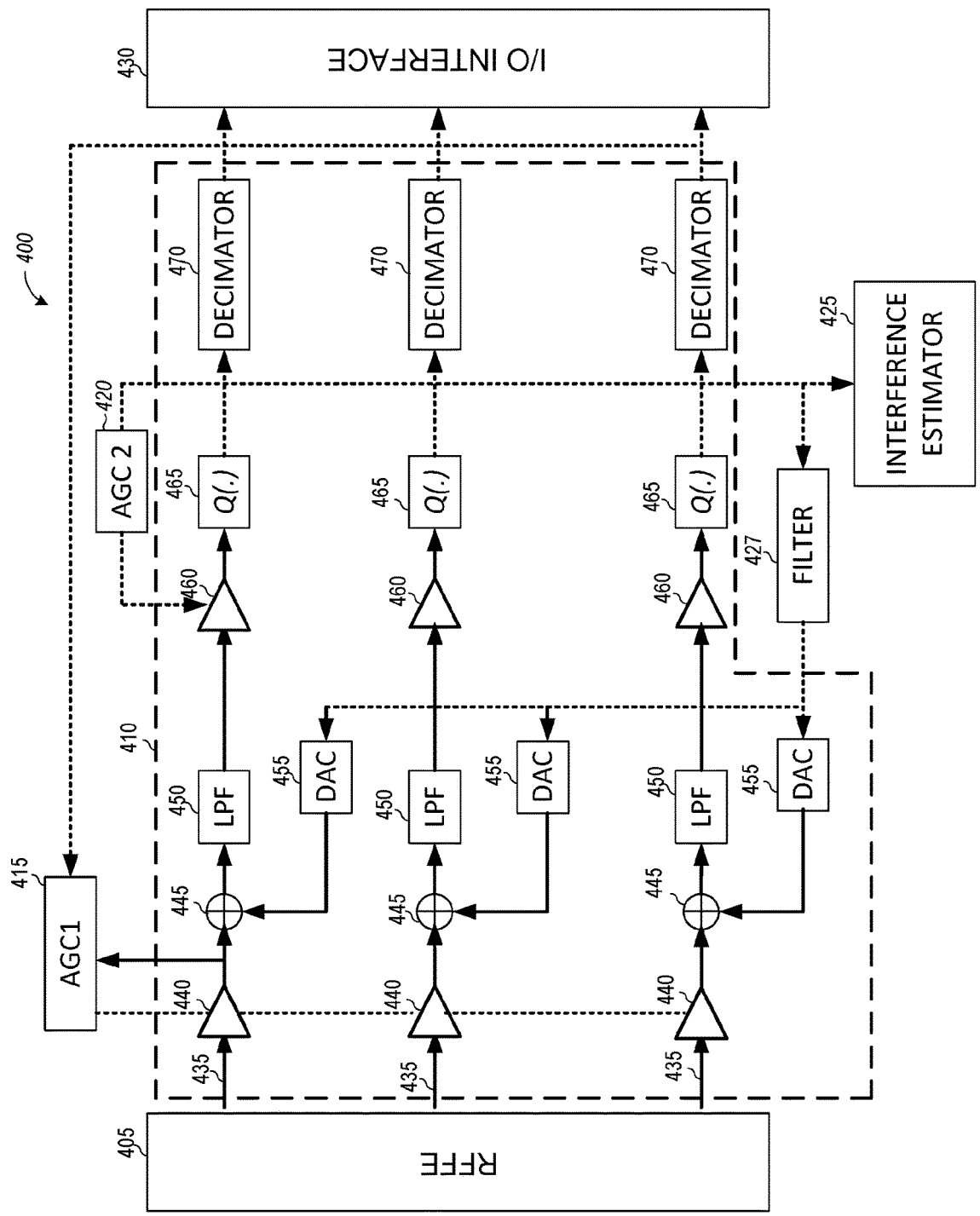
FIG. 6 illustrates exemplary receiver circuitry according to some aspects.

FIGS. 4-6 illustrate a mmWave receiver 400 in accordance with some aspects. The receiver 400 includes a radio frequency front end 405, delta sigma analog-to-digital converters (ΔΣ ADCs) 410, a first gain controller 415, a second gain controller 420, an interference estimator circuitry 425, a filter circuitry 427, and an input/output (I/O) interface 430.

The RFFE 405 in one example is a multiple antenna radio frequency front end. Each antenna receives analog signals and provides them into parallel channels 435.

The ΔΣ ADCs 410 in one example are in each channel 435. As illustrated in FIGS. 5-6, the ADCs 410 each include a first amplifier 440, combining circuitry 445, a low pass filter 450, a digital-to-analog converter (DAC) 455, a second amplifier 460 (FIG. 6), quantizer circuitry 465, and decimator circuitry 470.

The receiver 400 can be configured to operate in two separate modes depending on the calculations and determinations made by the interference estimator circuitry 425. In a first mode, as illustrated in FIG. 5, the interference estimator circuitry 425 determines if a sampled first signal includes interference. If no interference in a signal is detected, interference cancellation is unneeded and the second gain controller 420 does not adjust gain in the channels at the second amplifier 460. Specifically, the interference filter 427 is set to an identity matrix that takes the output of i'th quantizer and feeds to the i'th DAC, I=1, . . . , $N_r$. Therefore, the receiver 400 operates in an unfiltered delta-sigma state of operation.

When the interference estimator module 425 determines that a signal, such as a first signal, includes interference, the estimator causes operation of the receiver 400 in a second mode as illustrated in FIG. 6. In the second mode, because interference is detected, the filter 427 operates to provide cancellation of the interference while the second gain controller 420 varies the gain provided by the second amplifiers 460.

Figure 7:
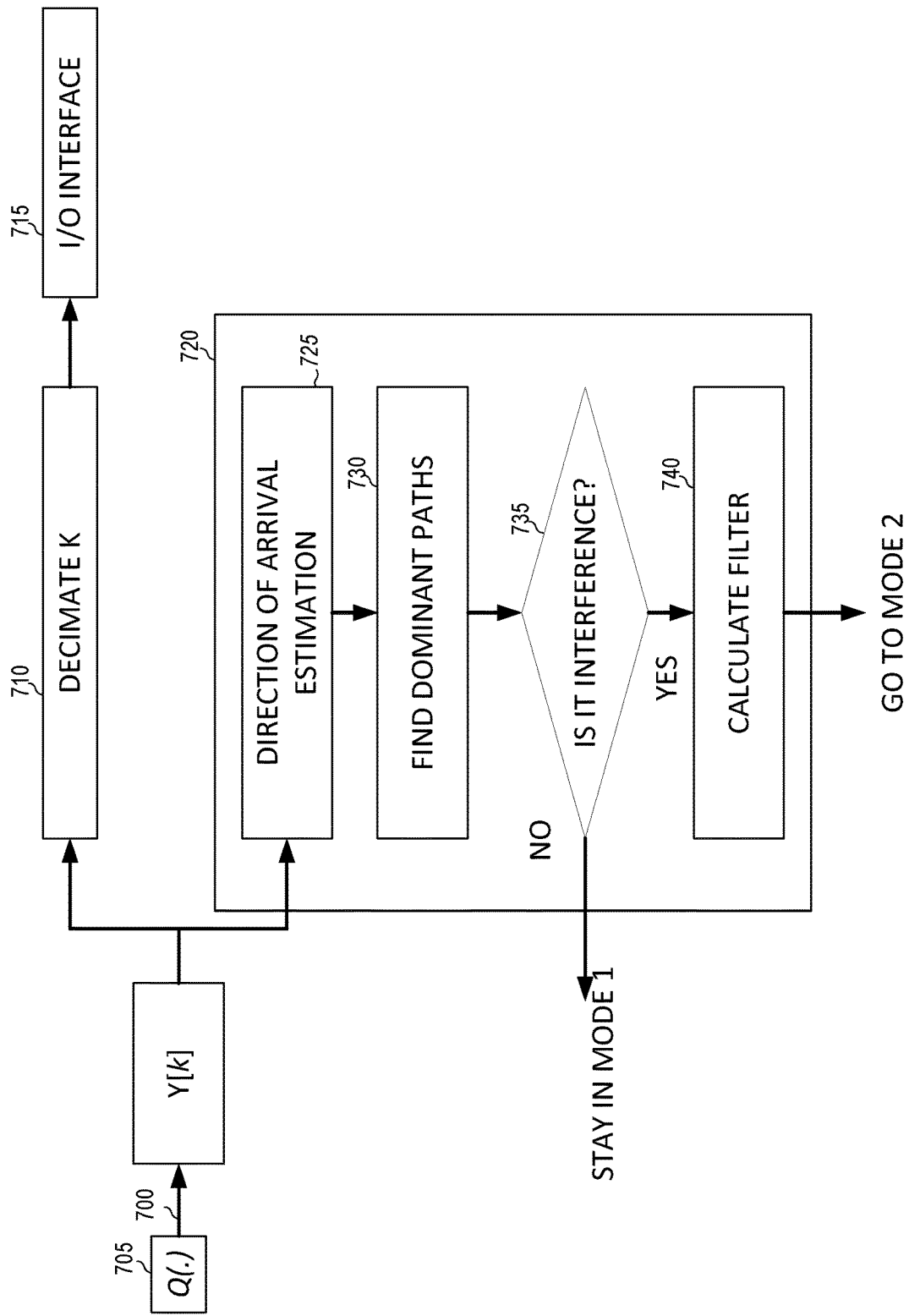
FIG. 7 illustrates exemplary flow block diagram of receiver operations according to some aspects.

FIG. 7 illustrates a flow block diagram of operations of a receiver starting a first mode, where an interference estimator module is operating within the receiver to determine the mode of the receiver. In one example, the receiver is the receiver 400 of FIGS. 4-6. In the first mode, a first input signal 700 is sent from a quantizer 705 to a decimator 710 before being sent to the I/O interface 715. The interference estimator circuitry 720 samples the first input signal 700 and estimates the direction of arrival (DoA) of the signal at operation 725, utilizing an algorithm. In examples, the algorithm may be MUSIC, ESPRIT, compressive sensing, or the like to estimate the DoA.

At operation 730, the estimator circuitry 720 finds or determines the dominant path of the signal. Specifically, the algorithm utilizes a correlation between antenna elements to find receiving path directions. So, in an example, the set of angle of arrivals are $\theta_i \in \Phi$, a beamforming vector $p_i = \|c^T(\theta_i)Y\|_2^2$, i=1, . . . , |Φ| where $c^T(\theta_i) \in \mathbb{C}^{1 \times N}$, is the beamforming vector for the direction $\theta_i$, $Y \in \mathbb{C}^{N_r \times T} = [y[k], \ldots, y[k+T]]$ is the received signal during the preamble period. In this manner, the beamforming vector for $\theta_i$ can be designed such that nulls are formed towards other angle of arrivals $\Phi/\theta_i$ because the receiver is fully digital. A threshold $v_t$ is dynamically set and defined in one example according to power of dominant directions, and dominant paths that have a power above this threshold are identified as follows:

$$\Phi_d = \{\theta_i : p_i \geq v_t, i=1, \ldots, |\Phi|\}$$

Where $\Phi_d$ is the set of angle of arrivals corresponding to dominant receive paths.

The receive paths need to be identified because if such a path is interference, the interference saturates low dynamic range ADCs creating significant distortion to the received signal and undesired clipping. In addition, if the dominant receive path is a desired signal, removing smaller signal interferences is unnecessary because such smaller interferences are eliminated at the baseband. Thus, filtering and associated power consumption is undesired.

At operation 735, a decision is then made regarding whether the dominant path is interference. Specifically, for each dominant path in $\Phi_d$, a beam vector is applied to obtain a beam formed signal as follows:

$$z_j = c^T(\theta_j)Y, \forall \theta_j \in \Phi_d$$

In particular, the beamforming vector $c^T(\theta_j)$ rejects received signals from other directions. Then a time and frequency offset estimation is made to beamformed signal $z_j$. After frequency and time offset correction is provided, the beamformed signal $z_j$ is correlated with a preamble to estimate the received signal strength. If the received signal strength is below $p_j$, $\theta_j$ is identified as a direction of arrival of an interferer because the received signal from direction $\theta_j$ is uncorrelated with the preamble. Otherwise, the signal is correlated and consequently is designated as a desired signal. This is shown below:

$$1_{interference} = \{1, \text{ if } |z_j^H T_1|^2 \leq p_j - \delta, \theta_j \in \Phi_d\}$$

$$1_{interference} = \{0, \text{otherwise}, \theta_j \in \Phi_d\}$$

where $1_{interference}$ is an indicator function for interference and $\delta$ is a design choice to account for estimation errors. Thus, if the dominant path is not interference, and the decision at operation 735 is NO, the receiver remains in mode 1. If the dominant path is interference, and the decision at operation 735 is YES, a filter for the interference is calculated at operation 740.

Figure 8:
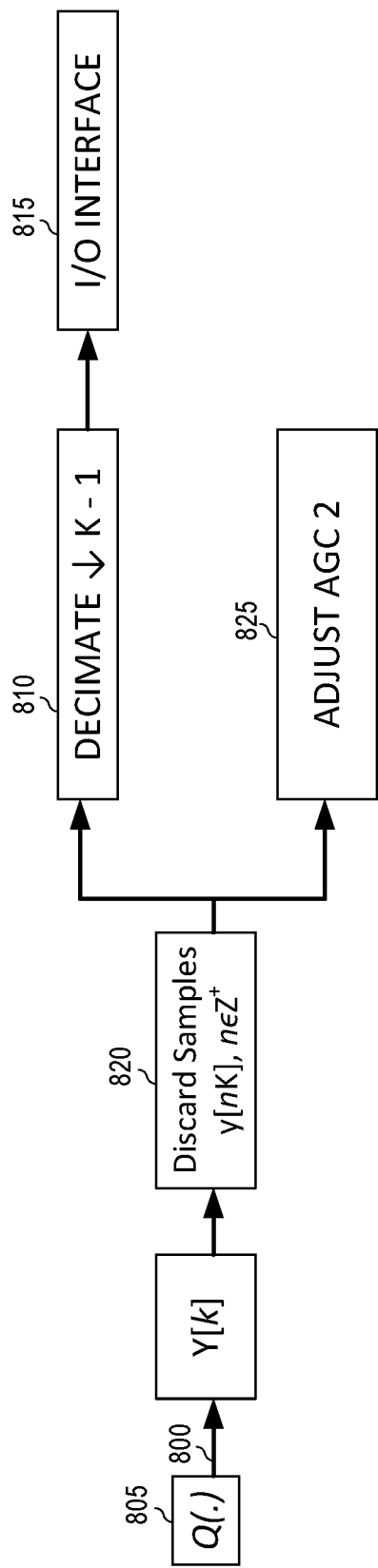
FIG. 8 illustrates exemplary flow block diagram of receiver operations according to some aspects.

Specifically, at operation 740, if the dominant path is interference, a filter is calculated. In this manner, if an interferer is detected in the first mode, the interference estimator circuitry 720 then switches the receiver to GO TO MODE 2 for operation as illustrated in FIG. 8. Thus, the receiver switches from operating as illustrated in FIG. 5, to operating as illustrated in FIG. 6.

FIG. 8 illustrates a flow block diagram of the receiver operating in a second mode (e.g., mode 2) where interference is being cancelled, in accordance with some aspects. In the second mode, a first input signal 800 is sent from a quantizer 805 to a decimator 810 before being sent to the I/O interface 815. In mode 2, for an oversampling ratio K at the delta-sigma ADC, when there is interference, every nK'th, $n \in Z^+$, sample contains an interference signal. Thus, at 820, these samples are discarded before sending to the decimator 810. With samples out of K is discarded, decimation does down sampling by a factor of K−1 before delivering data to I/O interface 815.

At operation 825, gain is adjusted before quantization with a gain controller. In one example, the gain controller is second gain controller 420 that controls second amplifier 460 of FIG. 6. Specifically, after cancelation of interference the power level of the received signal decreases. Therefore, the power of the signal must adjusted before quantization. Consequently, a gain controller is used to amplify the interference free signal, after cancellation of the interference. In particular, gain is provided to fit the signal within the dynamic range of the quantizers 805. In this manner, interference is minimized, if not eliminated by the receiver while still providing a robust signal for transmission.

Figure 9:
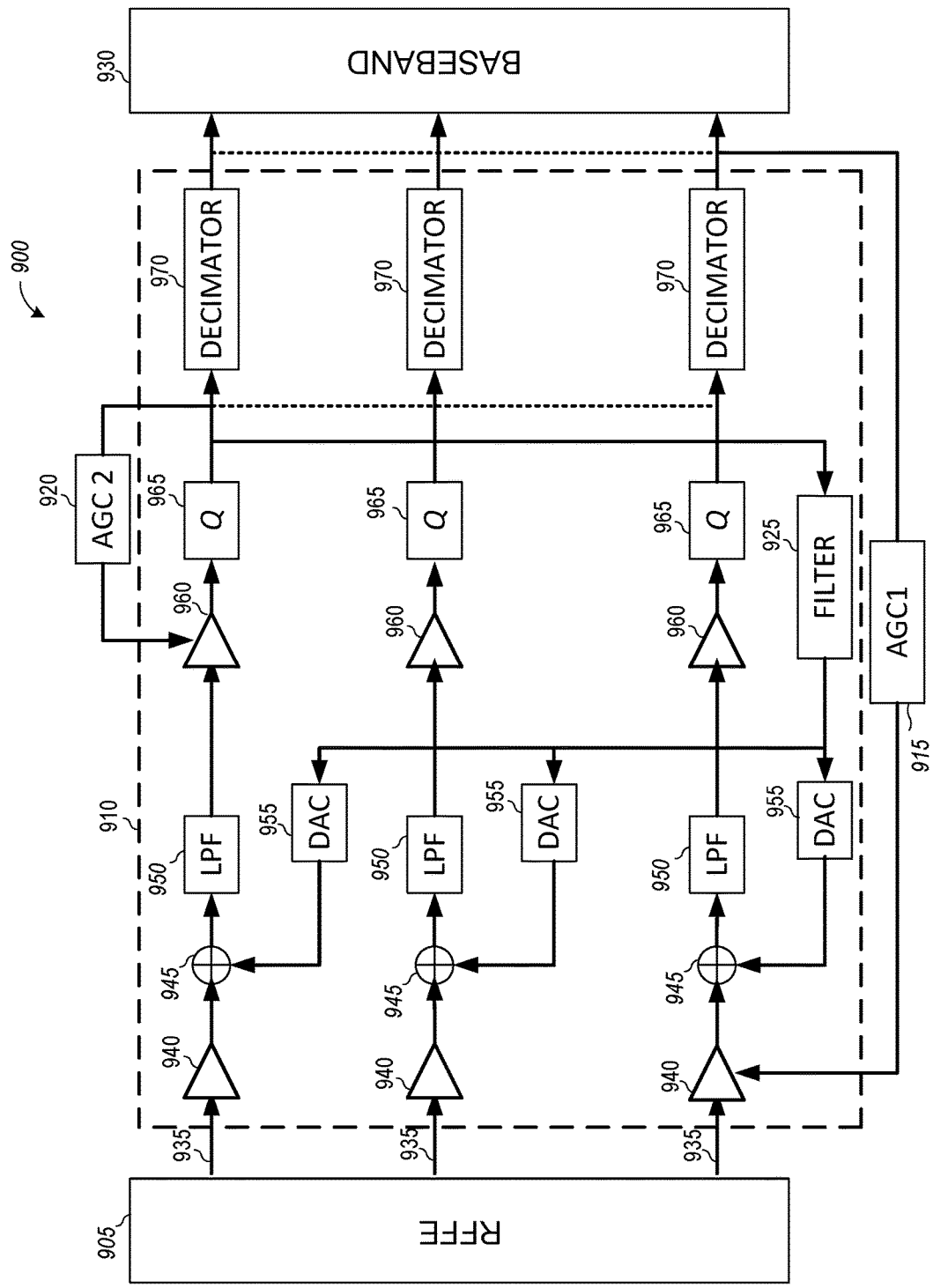
FIG. 9 illustrates exemplary receiver circuitry according to some aspects.

FIG. 9 illustrates a mmWave receiver 900 in accordance with some aspects. In one example, the receiver 900 is similar to the receiver of FIG. 6, operating based on the second mode of operation for a receiver utilizing an interference estimator such as interference estimator module 425. Alternatively, in another example, an interference estimator is not utilized. The mmWave receiver 900 includes a radio frequency front end 905, delta sigma analog to digital converters (ΔΣ ADCs) 910, a first gain controller 915, a second gain controller 920, a filter 925, and a baseband processor 930.

The RFFE 905 in one example is a multiple antenna radio frequency front end. Each antenna receives analog signals and provides them into parallel channels 935.

The ΔΣ ADCs 910 in one example are in each channel. The ADCs 910 each include a first amplifier 940, combining circuitry 945, a low pass filter 950, DAC 955, a second amplifier 960, quantizer circuitry 965, and decimator circuitry 970.

The first amplifier 940 receives an analog signal from an antenna of the RFFE 905 and provides gain to the signal before sending the signal to the combining module 945. In one example, the combining module 945 combines the amplified received signal with a filtered signal that is converted from a digital signal to an analog signal by digital to analog converter 955. In examples where cancelation of interference is required, this filtered signal is provided to reduce and/or eliminate such interference from the amplified signal. The signal is then received at the low pass filter 950 to shape quantization noise out of the band, and sent to the second amplifier 960, where amplification of the signal again occurs. The signal is then quantized by the quantizer circuitry 965, undergoes decimation to down sample the signal and finally provided to the baseband processor 930.

The first gain controller AGC1 915 receives a sample of the signal after decimation and to determine adjustment, or variation of the first amplifier 940 for a second signal, based on the first signal. In this manner, the first gain controller AGC1 915 controls the gain provided by the first amplifier 940 based on the initial signal.

In this example, the second gain controller AGC 2 920 and filter 925 sample the signal after the signal is quantized and before decimation. Specifically, in this example, the second gain controller 920 includes a detector with an algorithm that estimates the direction of arrival of interference, designs a feedback filter for providing input to the combining module 945, and calculates the gain for the second amplifier 960 based on the direction of arrival of the interference of the analog to digital converter.

Figure 10:
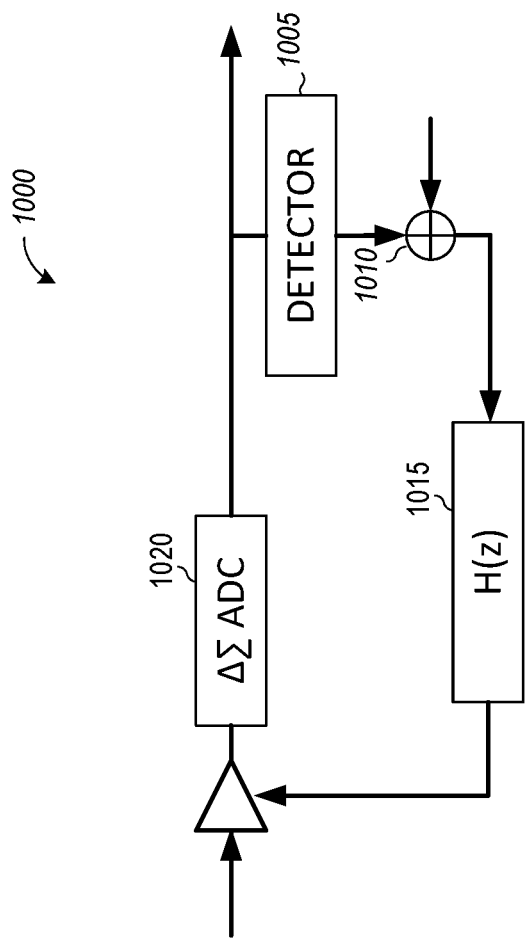
FIG. 10 illustrates exemplary gain controller circuitry according to some aspects.

FIG. 10 illustrates an exemplary gain controller 1000 that in one example is the first gain controller 915 illustrated in FIG. 9. The gain controller 1000 includes a detector 1005, combining circuitry 1010 that receives a reference signal, and gain circuitry 1015 of the detector 1005.

The gain controller 1000 samples a signal of the ΔΣ ADCs 1020. In one example, when a saturated signal is sampled, the gain controller utilizes an algorithm that estimates the saturated input signal. In particular, when a saturated signal is received, an estimation algorithm provides:

$$P(y[n] = d \mid P) = \frac{\sum 1_{y[n]=d}}{N}$$

With the following one-to-one function f(.), the received signal is estimated with:

$$\hat{P} = f\left(\frac{\sum 1_{y[n]=d}}{N}\right).$$

The controller 1000 utilizes a look-up table (LUT) to mimic the function f(.) to determine the estimate of the received signal during such saturation. The LUT is designed for the estimation of the received signal level according to a number of saturated samples. When considering the samples, samples of all of the antennas of the RFFE, such as RFFE 905, are utilized together because mmWave channels are correlated and similar power levels are presented across the antennas.

Gain is then adjusted accordingly on a first amplifier, such as first amplifier 940 of FIG. 9. Output of all the antenna of a RFFE are considered together for a multiple input receiver such that the same gain a is applied to each radio-frequency (RF) chain or channel. Using the same gain for each antenna also provides the advantage of having the same noise power for different channels in addition to lower complexity for the power receiver design. For subsequent signals, an algorithm of the detector 1005 is utilized for additional similar adjustments. Such an algorithm can include envelope, power detector, or the like. In this manner, an initial estimate is provided by utilizing the look up table and subsequent adjustments are then made by the detector algorithm.

Figure 11:
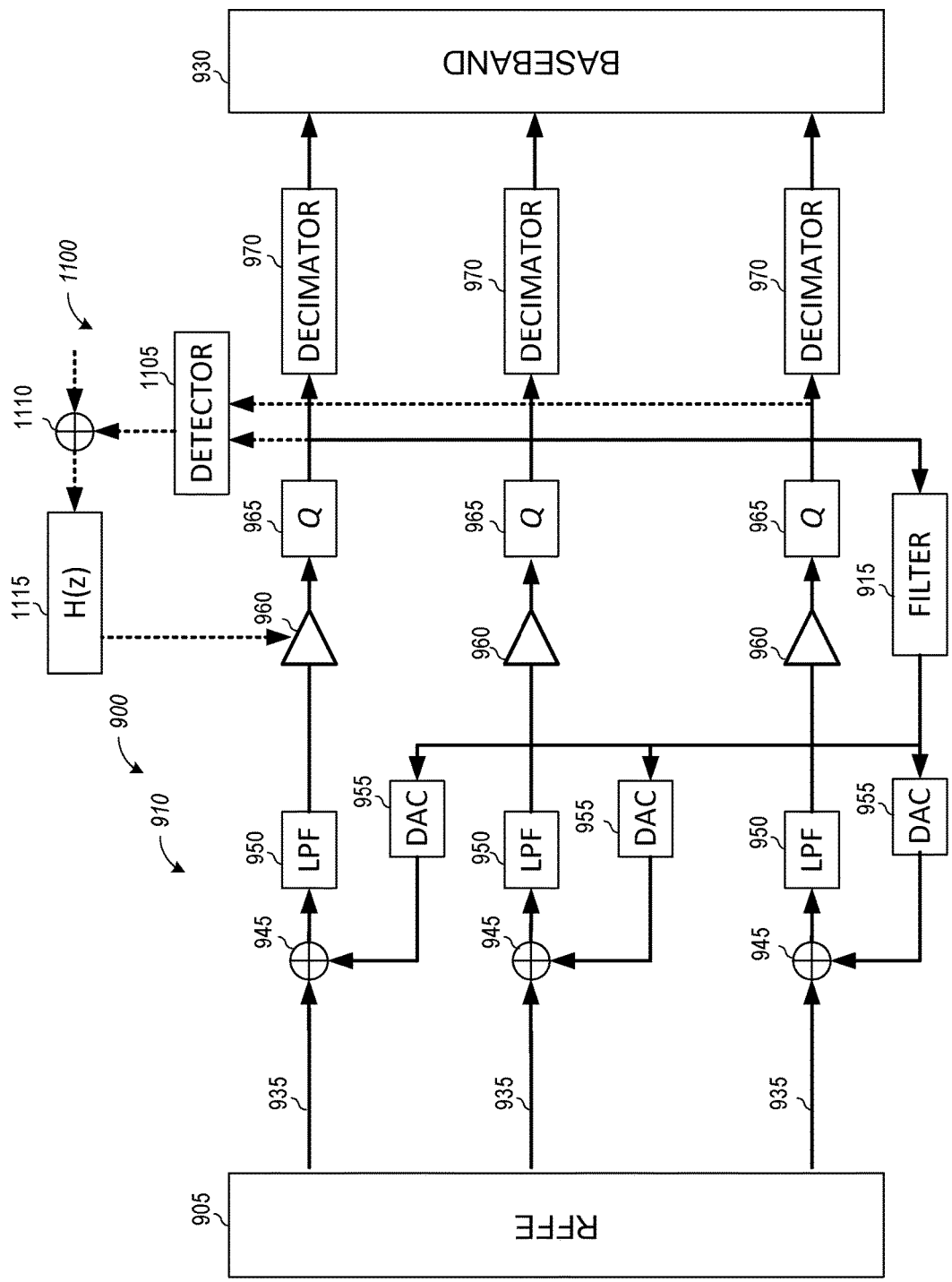
FIG. 11 illustrates exemplary gain controller circuitry according to some aspects.

FIG. 11 illustrates architecture and accompanying exemplary gain controller 1100 within the mmWave receiver 900 illustrated in FIG. 9. The first gain controller 915 and the first amplifier 940 have been excluded to only illustrate the gain controller 1100 architecture. In some aspects, the gain controller 1100 is the second gain controller 920. The gain controller 1100 includes a detector 1105, combining circuitry 1110 that receives the reference signal, and gain circuitry 1115 of the detector 1105. The gain circuitry 1115 in one example provides an algorithm to determine oversampling of the signal. Specifically, the gain module determines if the sample satisfies mod(n, OSR)≠1, where n is a sampling index at the output of the a quantizer Q(.) and OSR denotes the oversampling ratio of a ΔΣ ADC. Output of all the antenna of a RFFE are considered together for a multiple input receiver such that the same gain g is applied to each RF-chain or channel. After finding the optimal gain $g_{opt}$, gain g is changed according to the sampling index as follows:

$$g=1, \mod(n,OSR)=1; g=g_{opt}, \mod(n,OSR)\neq 1$$

Figure 12:
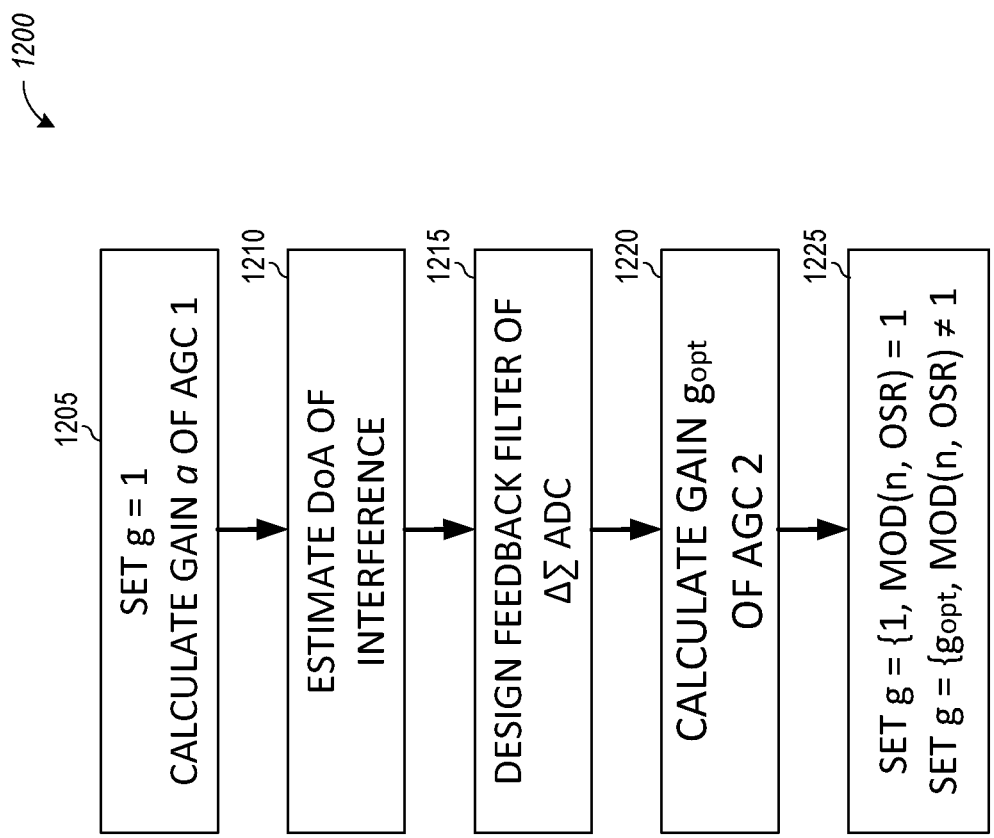
FIG. 12 illustrates exemplary flow block diagram of a gain algorithm according to some aspects.

FIG. 12 illustrates a flow chart of an example algorithm 1200 that in one example is utilized by the gain module 1115 of a gain controller 1100 of FIG. 11. In another example, the algorithm 1200 is utilized by the second gain controller 920 of receiver 900 of FIG. 9 and utilizes data collected from first gain controller 915. At operation 1205, the algorithm 1200 sets g=1 and gain a is calculated at a first gain controller. At operation 1210, the direction of interference of an inputted signal is estimated. At operation 1215, a feedback filter is designed of ΔΣ ADC. At operation 1220, gain $g_{opt}$ of the second gain controller is calculated. At 1225, g is set as:

$$g=1, \mod(n,OSR)=1; g=g_{opt}, \mod(n,OSR)\neq 1.$$

In an example, the feedback filter of 1215 is designed based on direction of arrival (DoA) estimation for directional blocker interference. After a first gain controller is adjusted to vary the gain a, the receiver receives a known preamble of K symbols. Such known preamble of K symbols may include a Golay sequence, a Zadoff-Chu (LTE) sequence, or the like from the transmitter. The receiver samples and quantizes such received signal that is represented as follows:

$$Y_q = Q_{ADC}(h_x x^T + h_i i^T + n)$$

Where $Y_q \in \mathbb{C}^{N_r \times K}$ is the output of ADC, $h_x \in \mathbb{C}^{N_r \times 1}$ is the channel vector from the associated transmitter, $h_i \in \mathbb{C}^{N_r \times 1}$ is the interference channel vector, $x \in \mathbb{C}^{K \times 1}$ is the known preamble vector, $i \in \mathbb{C}^{K \times 1}$ is the interference vector, $n \in \mathbb{C}^{N_r \times K}$ is the noise matrix, and $Q_{ADC}(.)$ represents the ΔΣ ADC operation.

Direction of interference is estimated using the matrix $Z_q$. In one example the direction of interference is estimated using one of MUSIC, Esprit, compressive sensing, or the like. Once the direction of the interferers is known, the algorithm provides the filter for cancelling the interference. In this manner, the filter design only requires direction of arrival of interferers.

In a comparison, the receiver 900 of FIG. 9 using the first gain controller of FIG. 10 and second gain controller of FIG. 11 that executes the algorithm as provided in FIG. 12 was compared to other receivers based on band error ratio (BER) vs. signal-to-noise ratio (SNR). $N_y=8$ antennas at the receiver were provided and the signal-to-interference ratio (SIR) was assumed to equal −30 dB, and direction of arrival (DoA) of interference was 110 degrees.

When the receiver 900 of FIG. 9 with a four (4)-bit quantizer is utilized, BER remains similar compared to a 7-bit ADC, digital band filter, and an infinity bit ADC, digital band filter; and lower than a 4-bit ADC, digital band filter, and an 8-bit ADC, analog band filter. Specifically, when a similar ΔΣ ADC receiver is utilized without the use of the first and second gain controllers with interference cancellation, resolution of the ADC would have to be increased, requiring more power. Meanwhile, compared to analog beamforming, such systems are limited by the array pattern, or codebook, and side lobe levels. When discrete Fourier transformation (DFT) based on codebooks is used in connection with such systems, limited interference rejection can be provided at the highest side lobe, which typically is insufficient to cancel interference.

Figure 13:
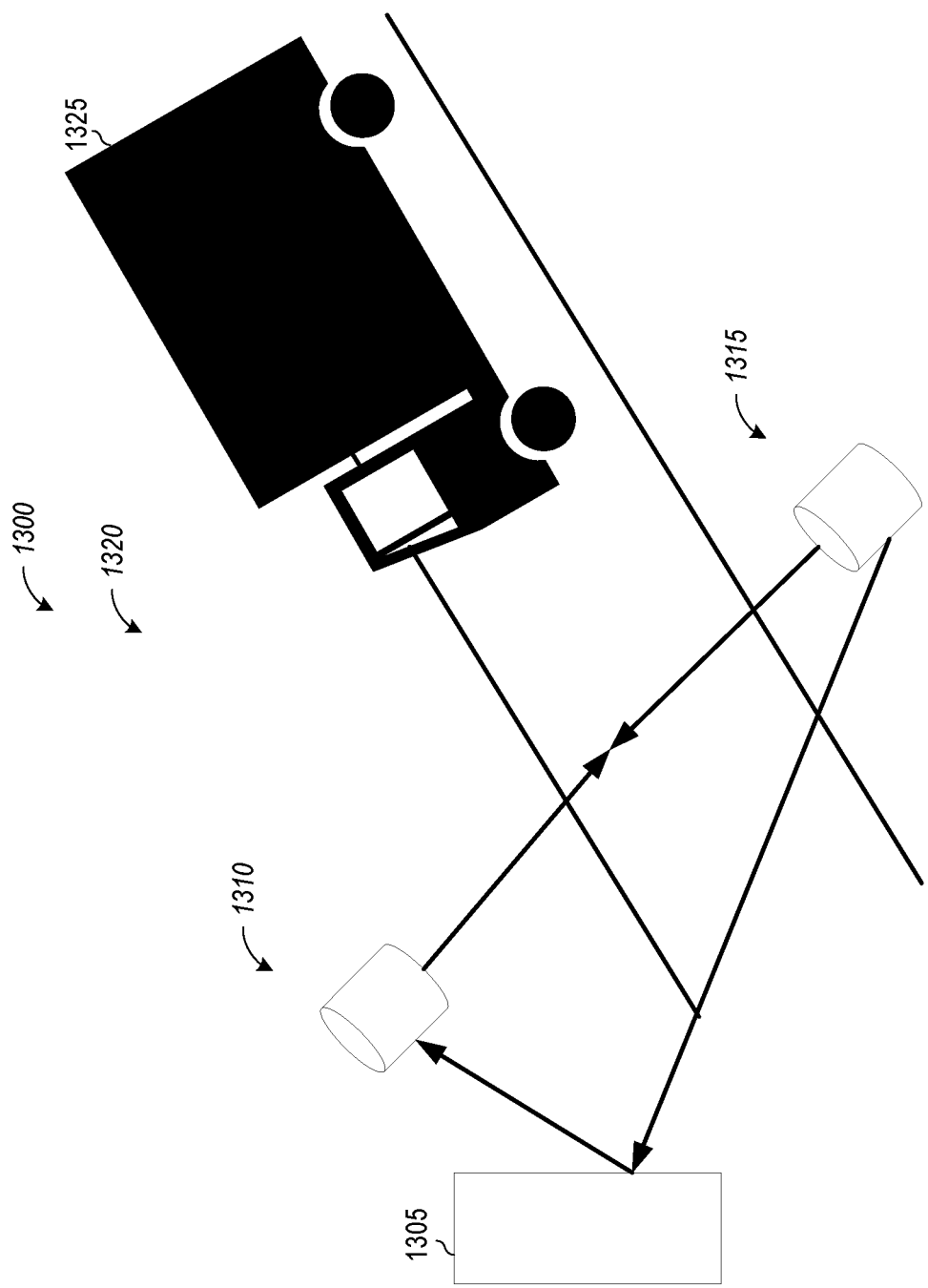
FIG. 13 illustrates a mmWave system, according to some aspects.

FIG. 13 illustrates another example mmWave communication system 1300 used to mitigate path blockage. The communication system 1300 includes a communication device 1305, a first sensor 1310, and a second sensor 1315, within an environment 1320 that includes an obstruction 1325. In this example, the environment 1320 is illustrated as a roadway and the obstruction 1325 is illustrated as a vehicle, and specifically a truck. Still, in other examples, the environment can be a location such as a park where a drone traverses and the obstacle may be a tree or building.

Each sensor 1310, 1315 is considered a remote or out of band system that is only temporarily coupled or in communication with the communication device 1305 while the communication device 1305 is within the environment 1320. Each sensor 1310, 1315 in an example may be a LIDAR, RADAR, SONAR, or the like to provide data and information to the communication device 1305. Each of the sensors 1310, 1315 is in communication with the communication device 1305, and optionally each other to share information and data related to the environment 1320. This includes information related to the obstruction 1325 such as position, speed, dimensions, and the like.

Figure 14:
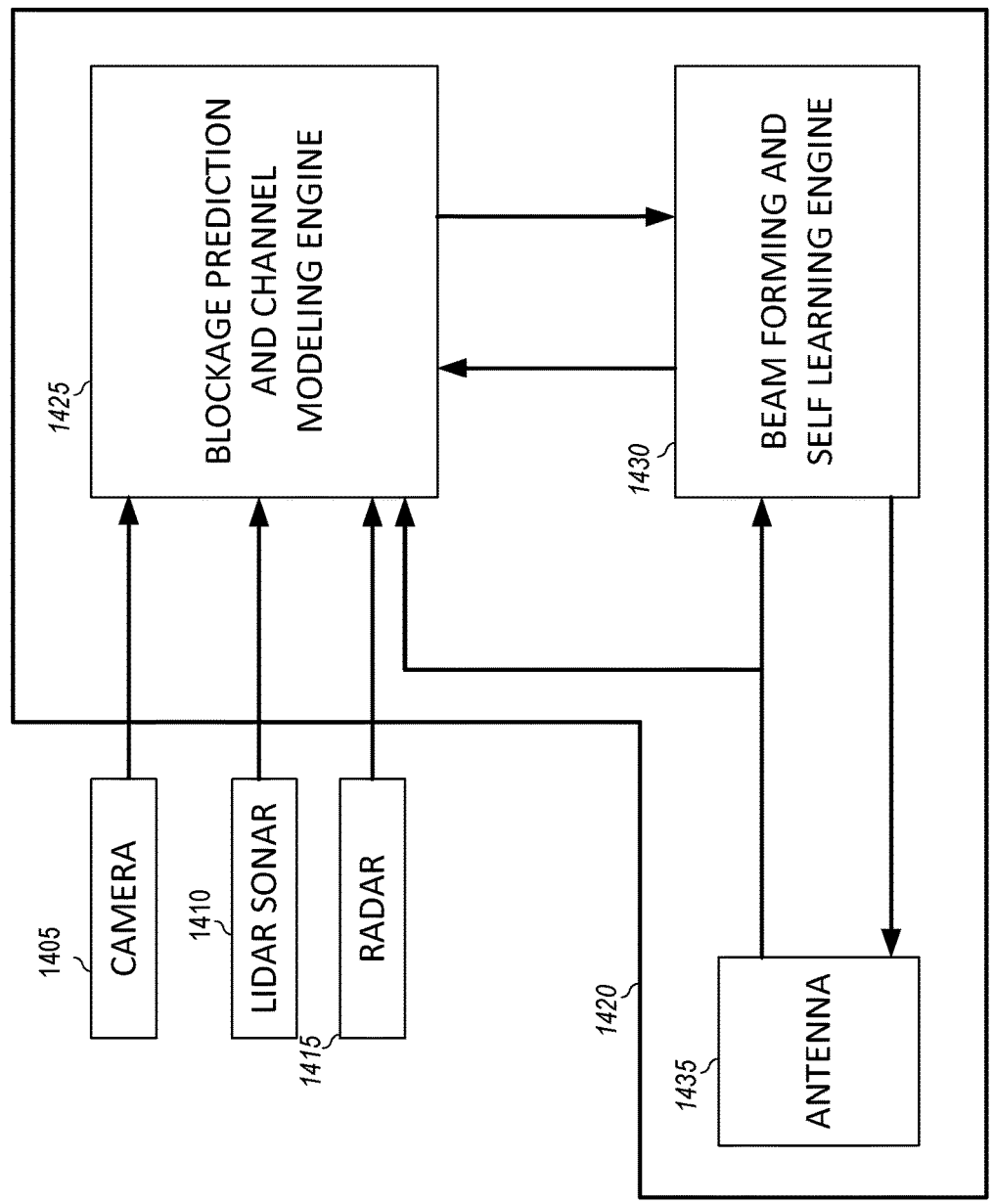
FIG. 14 illustrates a schematic block diagram of a communication system according to some aspects

FIG. 14 illustrates a schematic block diagram of a communication system 1400 that in one example is communications system 1300 of FIG. 13. The system 1400 includes a camera system 1405, LIDAR and SONAR system 1410, RADAR system 1415, and a communication device 1420 that includes blockage prediction and channel modeling engine 1425, a beamforming and self-learning engine 1430, and a beamforming antenna 1435.

The camera system 1405 may be of any type including digital, infrared, 3D, and the like. The camera system 1405 may be coupled to or related to a vehicle, street sign, road marker, building, or the like. Similarly, the LIDAR and SONAR system 1410 and the RADAR system 1415 may be coupled to or related to a vehicle, street sign, road marker, building, or the like. While described as a LIDAR and SONAR system, in one example separate LIDAR and SONAR systems are provided. In another example, only a camera system 1405, LIDAR system, or SONAR system 1410 is provided. Each of these out of band systems provides data or information about a given environment such as an image of a potential obstruction, distance from the system, radio frequency properties, or the like.

The channel modeling engine 1425 receives inputs from the different systems 1405, 1410, 1415 regarding potential obstructions, such as line of sight obstructions or reflecting objects within the physical channel of a beam to be transmitted. This includes information and data related to the radio frequency (RF) environment of the potential pathway, which in one embodiment includes in-band information from the communication device.

The channel modeling engine 1425 utilizes these inputs with a ray tracing model in order to trace the pathway of all beams of the communication device 1420 to predict the propagation characteristics of all beams at a given point in time. The channel modeling engine 1425 also incorporates a prediction algorithm that tracks obstructions in the physical channel, extrapolates the trajectory and predicts obstructions to the link. The results from this prediction algorithm is then incorporated into the propagation model generated by the channel modeling engine 1425.

In the ray tracer, the rays are traced along a physically realizable path until they intercept an object. The ray properties also include the RF parameters like polarization state, phase, position, direction, and the like. The ray tracer also utilizes physical optics kits that include both specular and diffuse reflection of millimeter wave frequency domain. Specifically, because only a finite number of beams are being traced, the tracing minimal time requirements to generate such rays is required.

The beam forming engine 1430 receives input from the beam propagation model generated by the channel modeling engine 1425 and determines an optimum beam. The optimum beam is determined based on the least probability of outage during transmission combined with greatest increase of link robustness. The beam forming engine 1430 thus performs virtual beam forming using the propagation model and compares the generated potential beams. The beam forming engine 1430 then selects the optimum beam based on the generated potential beams for that point in time. This results in adjustment of the beam to account for obstructions within an environment based on the sensor or system information related to the environment.

Figure 15:
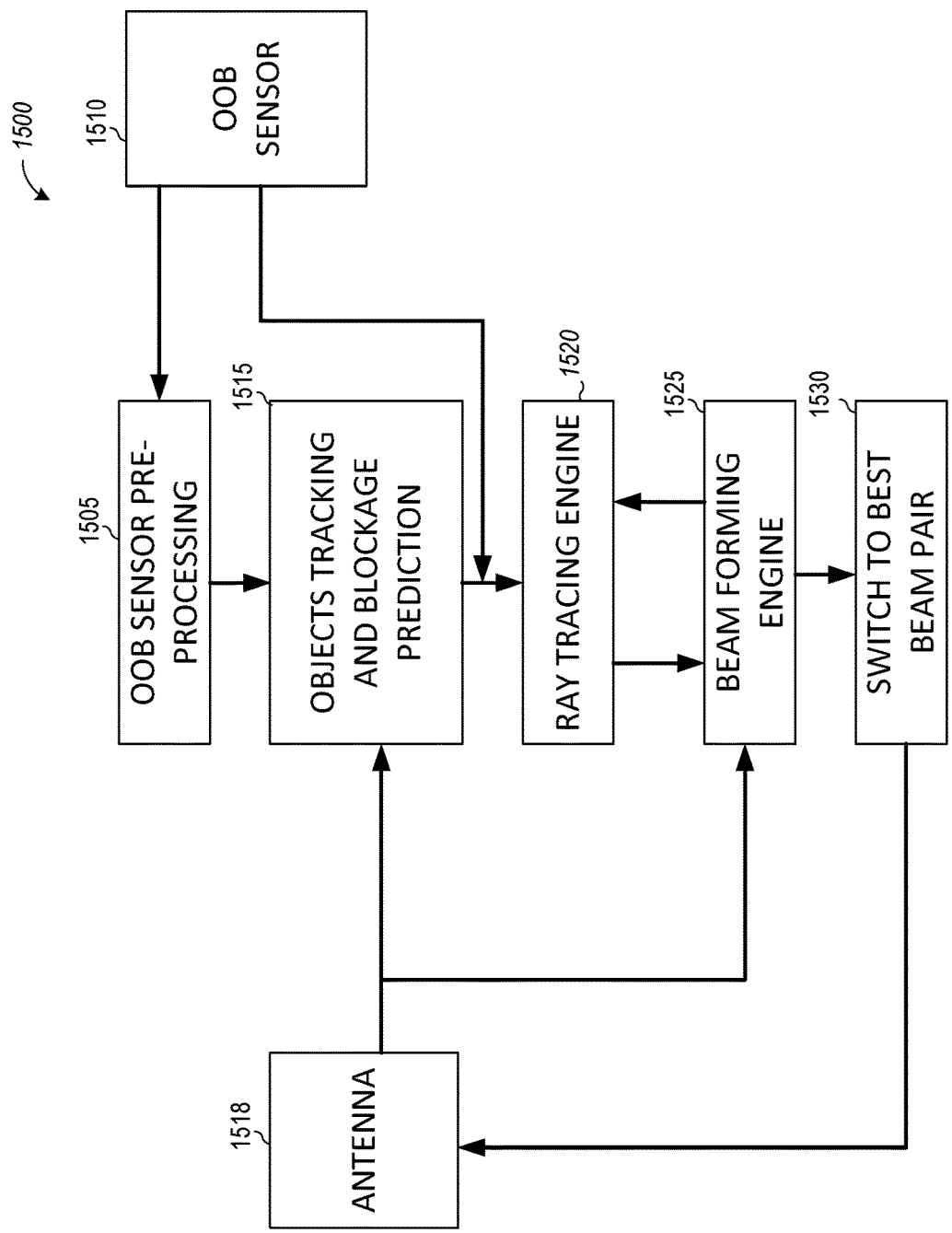
FIG. 15 illustrates a schematic block flow diagram of the algorithm according to some aspects.

FIG. 15 illustrates a schematic block flow diagram of the technique 1500 utilized by an example channel modeling engine and beam forming engine. In some aspects, the channel modeling engine is the channel modeling engine 1425 of FIG. 14 while the beam forming engine is the beam forming engine 1430 of FIG. 14.

At operation 1505, signals containing data and information are received by a communication device from out of band sensors 1510 and processed. Such out of band sensors include, but are not limited to camera systems, LIDAR systems, SONAR systems, RADAR systems, and the like. Once processed, at operation 1515, the processed obstruction and scene information and data is received, along with in-band link or beam information from an antenna 1518, and obstruction tracking and blockage predictions are determined accordingly. At operation 1520, the ray tracing engine receives predicted obstructions and/or blockages along with additional sensor information related to the potential obstructions and blockages. In addition, feedback is provided from the beam forming engine related to previous formed beams. From all of this information and data, the ray tracing engine provides a beam propagation model of the potential pathways of different beams that are formed.

At operation 1525, the beam forming engine receives the beam propagation model from the ray tracing engine along with in-band link quality data metrics from the antenna 1518. At operation 1530, the communication device adjusts its output to be the best beam pair provided by the communication device for the antenna 1518.

By using the described systems, including system 1400 and methodology, performance of the link itself and is unaffected while eliminating the need to provide a beam searching process, thus eliminating inaccuracies and power loss associated with the beam searching process. Instead, in line-of-sight deployment when the main factors effecting beam robustness are dynamic reflectors and blockage, and/or when significant redundant information is received by the out of band sensors/systems, significant mitigation of signal interruption and loss is provided with minimal additional processing power utilization.

Figure 16:
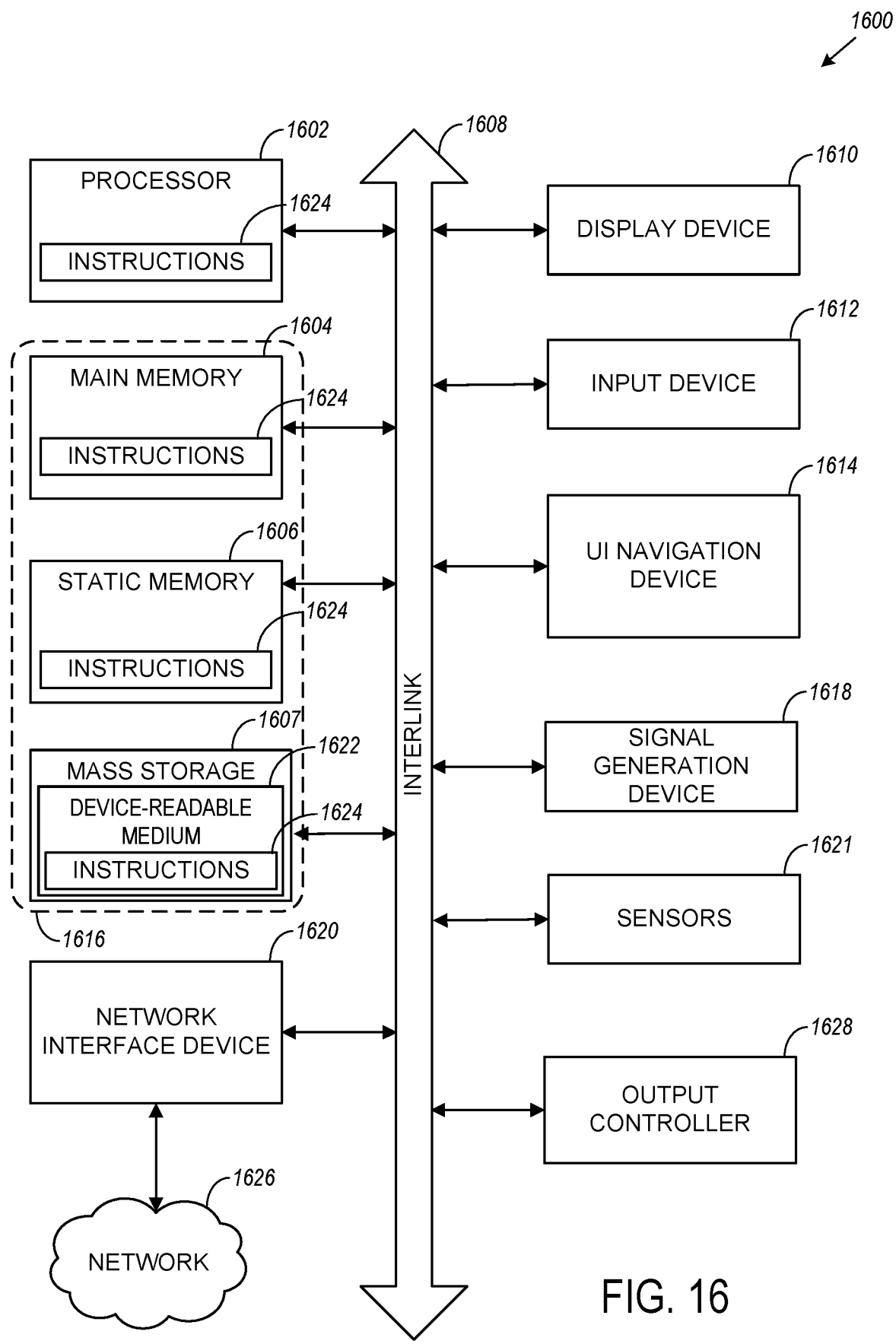
FIG. 16 illustrates a block diagram of a machine according to some aspects.

FIG. 16 illustrates a block diagram of an example machine 1600 upon which any one or more of the techniques (e.g., methodologies) discussed herein may perform. The machine (e.g., computer system) 1600 may include a hardware processor 1602 (e.g., a central processing unit (CPU), a graphics processing unit (GPU), a hardware processor core, or any combination thereof), a main memory 1604 and a static memory 1606, mass storage 1607, some or all of which may communicate with each other via an interlink (e.g., bus) 1608. The machine 1600 may further include a display unit 1610, an alphanumeric input device 1612 (e.g., a keyboard), and a user interface (UI) navigation device 1614 (e.g., a mouse). In an aspect, the display unit 1610, input device 1612 and UI navigation device 1614 may be a touch screen display. The machine 1600 may additionally include a storage device (e.g., drive unit) 1616, a signal generation device 1618 (e.g., a speaker), a network interface device 1620, and one or more sensors 1621, such as a global positioning system (GPS) sensor, compass, accelerometer, or other sensor. The machine 1600 may include an output controller 1628, such as a serial (e.g., universal serial bus (USB)), parallel, or other wired or wireless (e.g., infrared (IR), near field communication (NFC), etc.) connection to communicate or control one or more peripheral devices (e.g., a printer, card reader, etc.).

The storage device 1616 may include a machine readable medium 1622 on which is stored one or more sets of data structures or instructions 1624 (e.g., software) embodying or utilized by any one or more of the techniques or functions described herein. The instructions 1624 may also reside, completely or at least partially, within the main memory 1604, within static memory 1606, or within the hardware processor 1602 during execution thereof by the machine 1600. In an aspect, one or any combination of the hardware processor 1602, the main memory 1604, the static memory 1606, or the storage device 1616 may constitute machine readable media. In some aspects, the machine readable medium may be or may include a non-transitory computer-readable storage medium. In some aspects, the machine readable medium may be or may include a computer-readable storage medium.

While the machine readable medium 1622 is illustrated as a single medium, the term "machine readable medium" may include a single medium or multiple media (e.g., a centralized or distributed database, and/or associated caches and servers) configured to store the one or more instructions 1624. The term "machine readable medium" may include any medium that is capable of storing, encoding, or carrying instructions for execution by the machine 1600 and that cause the machine 1600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some aspects, machine readable media may include non-transitory machine readable media. In some aspects, machine readable media may include machine readable media that is not a transitory propagating signal.

The instructions 1624 may further be transmitted or received over a communications network 1626 using a transmission medium via the network interface device 1620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an aspect, the network interface device 1620 may include one or more physical jacks (e.g., Ethernet, coaxial, or phone jacks) or one or more antennas to connect to the communications network 1626. In an aspect, the network interface device 1620 may include a plurality of antennas to wirelessly communicate using at least one of single-input multiple-output (SIMO), multiple-input multiple-output (MIMO), or multiple-input single-output (MISO) techniques. In some aspects, the network interface device 1620 may wirelessly communicate using Multiple User MIMO techniques. The term "transmission medium" shall be taken to include any intangible medium that is capable of storing, encoding or carrying instructions for execution by the machine 1600, and includes digital or analog communications signals or other intangible medium to facilitate communication of such software.

Various Notes & Aspects

Example 1 is a mobile communication device configured to cancel interference within received millimeter wave band signals, the device comprising: a receiver circuit configured to: receive a millimeter wave band signal; adjust gain provided to the millimeter wave band signal at a first amplifier; cancel interference in millimeter wave band signal after gain is adjusted by the first amplifier; adjust gain provided to the millimeter wave band signal at a second amplifier after interference is cancelled.

In Example 2, the subject matter of Example 1 optionally includes the receiver circuit further configured to: determine interference of the millimeter wave band signal.

In Example 3, the subject matter of Example 2 optionally includes wherein to determine interference of the millimeter wave band signal the receiver circuit is further configured to: estimate a direction of arrival of the millimeter wave band signal; determine dominant paths of the millimeter wave band signal based on the direction of arrival; determine if the millimeter wave band signal includes interference based on the determined dominant paths.

In Example 4, the subject matter of any one or more of Examples 1-3 optionally include wherein the receiver circuit comprises: a first gain control system including a detector coupled to the first amplifier for sampling the millimeter wave band signal; and a second gain control system including a detector coupled to the second amplifier for sampling the millimeter wave band signal.

In Example 5, the subject matter of Example 4 optionally includes wherein the first gain control system is configured to: estimate power of the millimeter wave band signal based of a millimeter wave band signal sample.

In Example 6, the subject matter of Example 5 optionally includes wherein the first gain control system is further configured to: receive a plurality of saturated millimeter wave band signal samples; and estimate a power level of the millimeter wave band signal based on the plurality of saturated millimeter wave band signal samples.

In Example 7, the subject matter of Example 6 optionally includes wherein the first gain control system is further configured to: estimate the power level of the millimeter wave band signal by utilizing a look up table; adjust the gain provided to the millimeter wave band signal based on the estimated power level.

In Example 8, the subject matter of Example 7 optionally includes wherein the first gain control system is configured to: adjust the gain provided to the millimeter wave band signal based on feedback related to a previous millimeter wave band signal.

In Example 9, the subject matter of any one or more of Examples 4-8 optionally include wherein the second gain control system is configured to: adjust the gain provided to the millimeter wave band signal based on a sampled millimeter wave and signal.

In Example 10, the subject matter of Example 9 optionally includes wherein the second gain control system is configured to: adjust the gain provided to the millimeter wave band signal based on a sampling index.

In Example 11, the subject matter of any one or more of Examples 1-10 optionally include the receiver circuit further configured to: convert the millimeter wave band signal to a digital representation of the millimeter wave band signal prior to adjusting the gain with the first amplifier.

Example 12 is a mobile communication device configured to cancel interference within received millimeter wave band signals, the device comprising: a receiver circuit configured to: receive a millimeter wave band signal; determine if the millimeter wave band signal includes interference; operate in a first mode to provide a gain adjustment to the millimeter wave band signal with a first amplifier when the millimeter wave band signal does not include interference; operate in a second mode to: cancel interference; and provide a gain adjustment to the millimeter wave band with the first amplifier and a gain adjustment to the millimeter wave band with a second amplifier when the millimeter wave band signal includes interference.

In Example 13, the subject matter of Example 12 optionally includes wherein to determine interference of the millimeter wave band signal the receiver circuit is further configured to: estimate a direction of arrival of the millimeter wave band signal; determine dominant paths of the millimeter wave band signal based on the direction of arrival.

In Example 14, the subject matter of Example 13 optionally includes wherein the receiver circuit is further configured to: calculate a filter; and switch from the first mode to the second mode.

In Example 15, the subject matter of any one or more of Examples 12-14 optionally include wherein the receiver circuit comprises: a plurality of analog to digital converters arranged in parallel.

In Example 16, the subject matter of any one or more of Examples 12-15 optionally include wherein receiver circuit comprises: a low pass filter coupled to the first amplifier and second amplifier to receive the millimeter wave band signal from the first amplifier and transmit the millimeter wave band signal to the second amplifier; a quantizer coupled to the second amplifier to receive the millimeter wave signal from the second amplifier.

In Example 17, the subject matter of Example 16 optionally includes wherein the receiver circuit further comprises: a decimation device coupled to the quantizer to receive the millimeter wave signal from the quantizer.

Example 18 is a mobile communication device configured to receive millimeter wave band signals, the device comprising: a beam forming circuit configured to: receive beam pathway data from a remote sensor; map a beam pathway environment based on the beam pathway data; form a beam based on the mapped beam pathway environment.

In Example 19, the subject matter of Example 18 optionally includes wherein the beam is a first beam and the beam forming circuit is further configured to: receive propagated beam data related to the first beam; update the beam pathway environment based on the propagated beam data; form a second beam based on the updated beam pathway environment.

In Example 20, the subject matter of Example 19 optionally includes wherein the received propagated beam data includes in band characteristics.

In Example 21, the subject matter of any one or more of Examples 19-20 optionally include wherein the beam forming circuit is further configured to: before receiving the propagated beam data, predict propagated beam data based on the mapped beam pathway environment based on modeling parameters; after receiving the propagated beam data, modifying the modeling parameters based on the received propagated beam data.

In Example 22, the subject matter of any one or more of Examples 18-21 optionally include wherein the remote sensor is one of LIDAR sensor, radar sensor, or a sonar sensor.

In Example 23, the subject matter of any one or more of Examples 18-22 optionally include wherein the remote sensor is coupled to a vehicle.

In Example 24, the subject matter of any one or more of Examples 18-23 optionally include a camera coupled to the beam forming circuit for sending beam pathway data.

In Example 25, the subject matter of any one or more of Examples 18-24 optionally include wherein the beam forming circuit is further configured to: receive beam pathway data from a remote camera.

Each of these non-limiting aspects may stand on its own, or may be combined in various permutations or combinations with one or more of the other aspects.

The above detailed description includes references to the accompanying drawings, which form a part of the detailed description. The drawings show, by way of illustration, specific aspects in which the invention may be practiced. These aspects are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other aspects may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description as examples or aspects, with each claim standing on its own as a separate aspect, and it is contemplated that such aspects may be combined with each other in various combinations or permutations. The scope of the invention should be determined with reference to the appended claims, along with the full scope of equivalents to which such claims are entitled.

What is claimed:

1. A mobile communication device configured to cancel interference within received millimeter wave band signals, the device comprising:
    an antenna array; and
    a receiver circuit coupled to the antenna array and including a plurality of receiver chains, each of the receiver chains including a corresponding analog-to-digital conversion (ADC) circuit, wherein a first of the ADC circuits is configured to:
    receive a first millimeter wave band signal corresponding to a first element of the antenna array;
    adjust a first gain provided to the first millimeter wave band signal at a first amplifier;
    after the gain is adjusted by the first amplifier, modify the first millimeter wave band signal using a first filter output signal, wherein said modifying at least partially cancels interference due to one or more interference signals in the millimeter wave band signal, wherein the one or more interfering signals arrive at the mobile communication device from one or more interference directions; and
    adjust a second gain provided to the first millimeter wave band signal at a second amplifier, after said modifying the first millimeter wave band signal.

2. The device of claim 1, the receiver circuit further configured to:
    determine that a vector input signal includes interference, wherein the vector input signal includes the first millimeter wave band signal as a component.

3. The device of claim 2, wherein, to determine that the vector input signal includes interference, the receiver circuit is further configured to:
    estimate directions of arrival of the vector input signal;
    determine dominant paths of the vector input signal using the directions of arrival; and
    determine if the vector input signal includes interference based on the determined dominant paths.

4. The device of claim 1, wherein the receiver circuit comprises:
    quantization circuitry;
    a first gain control system including a first detector coupled to the first amplifier, wherein the first detector is configured to sample quantized signals outputted by the quantization circuitry; and
    a second gain control system including a second detector coupled to the second amplifier, wherein the second detector is also configured to sample the quantized signals.

5. The device of claim 4, wherein the first gain control system is configured to:
    estimate a first power level of the first millimeter wave band signal based on a sample of a corresponding one of the quantized signals.

6. The device of claim 5, wherein the first gain control system is further configured to:
    receive samples of the corresponding quantized signal when the first millimeter wave band signal is in a saturated condition; and
    estimate a second power level of the first millimeter wave band signal based on said samples.

7. The device of claim 6, wherein said estimation of the second power level based on said samples is performed utilizing a look up table; wherein the first gain control system is further configured to adjust the first gain provided to the first millimeter wave band signal based on the estimated second power level.

8. The device of claim 4, wherein the first gain control system is further configured to:
    adjust the first gain provided to the first millimeter wave band signal based on feedback related to a previous millimeter wave band signal.

9. The device of claim 4, wherein the second gain control system is configured to:
    adjust the second gain provided to the first millimeter wave band signal based on a sample of a corresponding one of the quantized signals.

10. The device of claim 9, wherein said adjusting the second gain provided to the first millimeter wave band signal is performed based on a sampling index.

11. The device of claim 1, further comprising:
    a quantization circuit configured to generate a quantized vector signal; and
    a feedback filter configured to generate the first filter output signal by filtering the quantized vector signal.

12. An analog-to-digital conversion (ADC) circuit comprising:
    a first amplifier configured to amplify a first millimeter wave band signal using a first gain to obtain an amplified signal;
    a combiner circuit configured to modify the amplified signal using a first filter output signal, to obtain a modified signal, wherein said modifying at least partially cancels interference due to one or more interference signals in the amplified signal, wherein the one or more interfering signals correspond respectively to one or more interference directions; and
    a second amplifier configured to amplify the modified signal using a second gain, wherein said amplifying the modified signal produces an output signal.

13. The ADC circuit of claim 12, further comprising:
    a quantization circuit configured to quantize the output signal to obtain a first quantized signal; and
    a feedback filter configured to generate the first filter output signal based on quantized signals including the first quantized signal.

14. The ADC circuit of claim 13, wherein the second gain is set to a value that increases utilization of a dynamic range of the quantization circuit.

15. The ADC circuit of claim 12, wherein the feedback filter is set equal to an identity matrix when interference is not present.

16. The ADC circuit of claim 12, wherein the feedback filter has a structure of a square matrix.

17. The ADC circuit of claim 12, further comprising:
    a lowpass filter intervening between the combiner circuit and the second amplifier.

18. A method for operating an analog-to-digital conversion (ADC) circuit, the method comprising:
    amplifying a first millimeter wave band signal using a first gain to obtain an amplified signal;

modifying the amplified signal using a first filter output signal, to obtain a modified signal, wherein said modifying at least partially cancels interference due to one or more interference signals in the amplified signal, wherein the one or more interfering signals correspond respectively to one or more interference directions; and amplifying the modified signal using a second gain, wherein said amplifying the modified signal produces an output signal.

19. The method of claim 18, further comprising:

quantizing the output signal to obtain a first quantized signal; and filtering quantized signals including the first quantized signal to obtain the first filter output signal.

20. The method of claim 19, wherein the second gain is set to a value that increases utilization of a dynamic range of said quantizing.

\* \* \* \* \*